United States Patent
Dewa et al.

(10) Patent No.: US 8,307,123 B2
(45) Date of Patent: Nov. 6, 2012

(54) CONTENT DISTRIBUTION SYSTEM, DISTRIBUTION METHOD, CONTENT PROCESSING DEVICE, AND PROCESSING METHOD

(75) Inventors: Yoshiharu Dewa, Tokyo (JP); Naohisa Kitazato, Tokyo (JP); Tatsuya Shimoji, Osaka (JP); Yoshinori Matsui, Nara (JP)

(73) Assignees: Sony Corporation, Tokyo (JP); Panasonic Corporation, Kadoma-shi (JP)

( * ) Notice: Subject to any disclaimer, the term of this patent is extended or adjusted under 35 U.S.C. 154(b) by 0 days.

(21) Appl. No.: 12/775,756

(22) Filed: May 7, 2010

(65) Prior Publication Data

US 2010/0223674 A1   Sep. 2, 2010

Related U.S. Application Data

(63) Continuation of application No. 10/553,794, filed as application No. PCT/JP2004/005918 on Apr. 23, 2004, now Pat. No. 7,739,413.

(30) Foreign Application Priority Data

Apr. 24, 2003   (JP) ................................. 2003-120544

(51) Int. Cl.
   *G06F 15/16* (2006.01)
(52) U.S. Cl. ....................................... 709/250; 709/231
(58) Field of Classification Search .................. 709/231, 709/250

See application file for complete search history.

(56) References Cited

U.S. PATENT DOCUMENTS

| | | | |
|---|---|---|---|
| 6,226,618 B1 | 5/2001 | Downs et al. | |
| 6,385,596 B1 * | 5/2002 | Wiser et al. | 705/51 |
| 6,389,337 B1 * | 5/2002 | Kolls | 701/31.6 |
| 6,502,194 B1 * | 12/2002 | Berman et al. | 726/28 |
| 6,662,231 B1 * | 12/2003 | Drosset et al. | 709/229 |
| 6,873,975 B1 * | 3/2005 | Hatakeyama et al. | 705/51 |
| 7,096,203 B2 | 8/2006 | Pence et al. | |
| 7,209,892 B1 * | 4/2007 | Galuten et al. | 705/26.62 |
| 7,533,061 B1 * | 5/2009 | Cheng et al. | 705/50 |
| 2001/0049278 A1 | 12/2001 | Negishi | |

(Continued)

FOREIGN PATENT DOCUMENTS

JP   2000-31921   1/2000

(Continued)

OTHER PUBLICATIONS

Listen.com, Rhapsody (software), 2003, pp. 1-2.

(Continued)

*Primary Examiner* — Imad Hussain
(74) *Attorney, Agent, or Firm* — Oblon, Spivak, McClelland, Maier & Neustadt, L.L.P.

(57) ABSTRACT

The present invention provided a content delivery system that can deliver content by way of the Internet. In the system, a browser requests a content server to deliver a startup file. The content server transmits the startup file to the browser. The startup file describes that the content is to be delivered by streaming or that it is to be delivered by downloaded files. A content reproducing section determines if the content is that to be delivered by streaming or that to be delivered by downloaded files according to the description of the startup file it receives from the browser. A television receiving set may be used as content processing apparatus for receiving the delivery of the content from a content delivery apparatus of such a system.

18 Claims, 23 Drawing Sheets

U.S. PATENT DOCUMENTS

| | | | | |
|---|---|---|---|---|
| 2001/0049732 | A1* | 12/2001 | Raciborski et al. | 709/224 |
| 2002/0006204 | A1* | 1/2002 | England et al. | 380/269 |
| 2002/0007418 | A1* | 1/2002 | Hegde et al. | 709/231 |
| 2002/0013772 | A1* | 1/2002 | Peinado | 705/51 |
| 2002/0019814 | A1* | 2/2002 | Ganesan | 705/59 |
| 2002/0069420 | A1* | 6/2002 | Russell et al. | 725/92 |
| 2002/0073220 | A1* | 6/2002 | Lee | 709/231 |
| 2002/0091848 | A1* | 7/2002 | Agresta et al. | 709/231 |
| 2002/0107809 | A1* | 8/2002 | Biddle et al. | 705/59 |
| 2002/0120577 | A1* | 8/2002 | Hans et al. | 705/59 |
| 2002/0123956 | A1* | 9/2002 | Galuten | 705/37 |
| 2002/0147929 | A1* | 10/2002 | Rose | 713/201 |
| 2002/0156691 | A1* | 10/2002 | Hughes et al. | 705/26 |
| 2002/0169974 | A1* | 11/2002 | McKune | 713/200 |
| 2002/0188955 | A1* | 12/2002 | Thompson et al. | 725/110 |
| 2003/0004884 | A1* | 1/2003 | Kitazato | 705/51 |
| 2003/0009247 | A1* | 1/2003 | Wiser et al. | 700/94 |
| 2003/0028272 | A1* | 2/2003 | Sugiura | 700/94 |
| 2003/0066884 | A1* | 4/2003 | Reddy et al. | 235/382.5 |
| 2003/0084306 | A1* | 5/2003 | Abburi et al. | 713/188 |
| 2003/0097655 | A1* | 5/2003 | Novak | 725/31 |
| 2003/0115069 | A1* | 6/2003 | Pence et al. | 705/1 |
| 2003/0149671 | A1* | 8/2003 | Yamamoto et al. | 705/59 |
| 2003/0158958 | A1* | 8/2003 | Chiu | 709/231 |
| 2003/0187801 | A1* | 10/2003 | Chase et al. | 705/59 |
| 2003/0217113 | A1* | 11/2003 | Katz et al. | 709/213 |
| 2003/0233561 | A1* | 12/2003 | Ganesan et al. | 713/193 |
| 2004/0044569 | A1* | 3/2004 | Roberts et al. | 705/14 |
| 2004/0170159 | A1* | 9/2004 | Kim et al. | 370/352 |
| 2004/0172533 | A1* | 9/2004 | DeMello et al. | 713/164 |
| 2004/0181490 | A1* | 9/2004 | Gordon et al. | 705/59 |
| 2004/0196972 | A1* | 10/2004 | Zhu et al. | 380/45 |
| 2004/0199654 | A1* | 10/2004 | Juszkiewicz | 709/231 |
| 2004/0221308 | A1* | 11/2004 | Cuttner et al. | 725/46 |
| 2005/0192907 | A1* | 9/2005 | Blinn et al. | 705/59 |
| 2005/0262260 | A1* | 11/2005 | Kim et al. | 709/231 |
| 2007/0050301 | A1* | 3/2007 | Johnson | 705/59 |
| 2007/0250716 | A1* | 10/2007 | Brunk et al. | 713/176 |

FOREIGN PATENT DOCUMENTS

| | | |
|---|---|---|
| JP | 2000-349725 | 12/2000 |
| JP | 2002-141901 | 5/2002 |
| JP | 2002-342518 | 11/2002 |
| JP | 2002-351912 | 12/2002 |
| JP | 2002-369174 | 12/2002 |
| JP | 2002-374463 | 12/2002 |
| JP | 2003-22337 | 1/2003 |
| JP | 2003-30078 | 1/2003 |
| JP | 2003-87751 | 3/2003 |
| JP | 2003-91347 | 3/2003 |
| WO | WO 01/25948 | 4/2001 |
| WO | WO 02/21838 A1 | 3/2002 |

OTHER PUBLICATIONS

Summons to Attend Oral Proceedings dated Jul. 9, 2012 for European Patent No. 04729255.2.

* cited by examiner

```
<html>
<head>
<meta name="distribution" content="stream">
<meta name="content-id" content="<content-id1>"
<meta http-equiv="refresh" content="1;
url=http://contents_server.ssny.co.jp/sample.tts">
</head>
<body>
</body>
```

FIG. 10

```
<html>
<head>
<meta name="distribution" content="download">
<meta name="content-id" content="<content-id2>"
<meta http-equiv="refresh" content="1;
url=http://contents_server.ssny.co.jp/sample.tts">
</head>
<body>
</body>
```

FIG. 13

```
<html>
<head>
<meta name="distribution" content="stream">
<meta name="content-id" content="<content-id3>"
<meta http-equiv="refresh" content="1;
url=rtp://contents_server.ssny.co.jp/sample.tts">
</head>
<body>
</body>
```

CONTENT DISTRIBUTION SYSTEM, DISTRIBUTION METHOD, CONTENT PROCESSING DEVICE, AND PROCESSING METHOD

CROSS-REFERENCE TO RELATED APPLICATIONS

This application is a continuation of and is based upon and claims the benefit of priority under 35 U.S.C. §120 for U.S. Ser. No. 10/553,794, filed Oct. 18, 2005, the entire contents of which is incorporated by reference. U.S. Ser. No. 10/553,794 is a National Stage of PCT/JP04/05918, filed Apr. 23, 2004, and claims the benefit of priority under 35 U.S.C. §119 from Japanese Patent Application No. 2003-120544, filed Apr. 24, 2003, the entire contents of each which are incorporated herein by reference.

TECHNICAL FIELD

The present invention relates to a content delivery system, a content delivery method, a content processing apparatus and a content processing method. More particularly, it relates to a content delivery system, a content delivery method, a content processing apparatus and a content processing method that can deliver content without puzzling the user. The present invention further relates to a recording medium where a program to be executed by such a content processing apparatus is installed and also to such a program.

This patent application claims priority of Japanese Patent Application Laid-Open No. 2003-120544 filed on Apr. 24, 2003, the entire content of which is incorporated herein by reference.

BACKGROUND ART

As a result of the wide spread use of the Internet and other communication network systems in recent years, various content of audio/visual works are being delivered by way of the Internet. Japanese Patent Application Laid-Open No. 2003-69977 proposes a technique of effectively delivering advertisement information to the user from the providers of such content.

Known methods for delivering content of audio/visual works by way of the Internet include delivery by streaming and delivery by downloaded files. In the case of delivery by streaming, the content receiving party can output the data received by way of the Internet to a display so as to have it display the content for viewing.

On the other hand, in the case of delivery by downloaded files, the delivered content data are stored in a hard disc or the like once. Then, the user/viewer reproduces the files stored in the hard disc and watches the content anytime he or she likes.

Since delivery by streaming does not involve the need of storing a large volume of received data, it is possible for a viewer to watch the delivered content even if he or she does not have a hard disc or some other large capacity storage device. On the other hand, the viewer will have to face a large bill if the accounting system of the delivery service is based on connect time because the viewer has to be connected constantly with the server who provides the service of delivering the content of audio/visual works as long as the viewer receives such content.

To the contrary, in the case of delivery by downloaded files, the user/viewer can disconnect the line with the server when the transfer of the file is completed to consequently reduce the connect time because it is no longer necessary for the view to be connected to the server. Additionally, since the content is stored at side of the content receiving party, the user/viewer can watch them whenever he or she likes thereafter.

Thus, delivery by streaming and delivery by downloaded files have advantages and disadvantages. When the user/viewer watches and listens to the content by means of a personal computer, he or she may more often than not have knowledge about delivery by streaming and delivery by downloaded files. Then, it will not be any problem if the user/viewer is required to operate the computer differently for delivery by streaming and for delivery by downloaded files.

However, many users/viewers receiving the content of audio/visual works that are delivered by the Internet by means of a television receiving set for viewing may not have sufficient knowledge about delivery by streaming and delivery by downloaded files. Then, it may be a problem for such users/viewers to operate differently for delivery by streaming and for delivery by downloaded files. Such a situation may constitutes an obstacle when popularizing systems for delivering the content of audio/visual works by way of the Internet.

DISCLOSURE OF THE INVENTION

In view of the above-identified problem of the conventional art, it is therefore an object of the present invention to provide a content delivery system and a content delivery apparatus that are free from the problem.

Another object of the present invention is to provide a content delivery system and a content delivery apparatus that can delivery the content of audio/visual works by way of a network without forcing complicated cumbersome operations to ordinary users.

In an aspect of the present invention, there is provided a content delivery system comprising: presenting a list of a plurality of sets of content including at least a set of content to be delivered by streaming and a set of content to be delivered by downloaded files from the content processing apparatus to a user thereof, inputting specifying information specifying the set of content, from the sets of content on the list, to be delivered to the user of the content processing apparatus from the content processing apparatus; and acquiring by the content processing apparatus the set of content delivered from the content delivering apparatus according to delivery information specifying the set of content as one to be delivered by streaming or one to be delivered by downloaded files, the delivery information being provided by the content delivery apparatus by way of the network.

Thus, with the content delivery system according to the invention, a list of a plurality of sets of content including at least a set of content to be delivered by streaming and a set of content to be delivered by downloaded files is presented from the content processing apparatus to the user thereof and specifying information specifying the set of content to be delivered to the user is input from the content processing apparatus. Then, the content processing apparatus acquires the set of content delivered from the content delivering apparatus according to delivery information specifying the set of content as one to be delivered by streaming or one to be delivered by downloaded files, the delivery information being provided by the content delivery apparatus.

In another aspect of the present invention, there is provided a content delivery method comprising: presenting a list of a plurality of sets of content including at least a set of content to be delivered by streaming and a set of content to be delivered by downloaded files from a content processing apparatus to a user thereof; inputting specifying information specifying the set of content, from the sets of content on the list, to be delivered to the user of the content processing apparatus from the content processing apparatus; and acquiring by the content processing apparatus the set of content delivered from the content delivering apparatus according to delivery information specifying the set of content as one to be delivered by streaming or one to be delivered by downloaded files, the delivery information being provided by the content delivery apparatus by way of the network.

Thus, with the content delivery method according to the invention, a list of a plurality of sets of content including at least a set of content to be delivered by streaming and a set of content to be delivered by downloaded files is presented and, as specifying information specifying the set of content to be delivered is input, the set of content is acquired according to delivery information specifying the set of content as one to be delivered by streaming or one to be delivered by downloaded files.

In still another aspect of the present invention, there is provided a content processing apparatus comprising: a presentation means for presenting a list of a plurality of sets of content including at least a set of content to be delivered by streaming and a set of content to be delivered by downloaded files; an input means for inputting specifying information specifying the set of content to be delivered from the sets of content on the list; and an acquisition means for acquiring the set of content delivered from a content delivering apparatus by way of a network according to delivery information specifying each set of content as one to be delivered by streaming or one to be delivered by downloaded files, the delivery information being provided by the content delivery apparatus by way of the network.

The delivery information may be correlated with the license of the sets of content.

The delivery information may further include information for accessing the sets of content.

In still another aspect of the present invention, there is provided a content processing method comprising: a presentation step of presenting a list of a plurality of sets of content including at least a set of content to be delivered by streaming and a set of content to be delivered by downloaded files; an input step of inputting specifying information specifying the set of content to be delivered from the sets of content on the list; and an acquisition step of acquiring the set of content delivered from a content delivering apparatus by way of a network according to delivery information specifying each set of content as one to be delivered by streaming or one to be delivered by downloaded files, the delivery information being provided by the content delivery apparatus by way of the network.

In still another aspect of the present invention, there is provided a program recorded on a recording medium so as to be installed in a content processing apparatus for receiving content delivered from a content delivery apparatus by way of a network, the program comprising: a presentation step of presenting a list of a plurality of sets of content including at least a set of content to be delivered by streaming and a set of content to be delivered by downloaded files; an input step of inputting specifying information specifying the set of content to be delivered from the sets of content on the list; and an acquisition step of acquiring the set of content delivered from a content delivering apparatus by way of a network according to delivery information specifying each set of content as one to be delivered by streaming or one to be delivered by downloaded files, the delivery information being provided by the content delivery apparatus by way of the network.

In a further aspect of the present invention, there is provided a program to be installed in a content processing apparatus for receiving content delivered from a content delivery apparatus by way of a network, the program being adapted to cause a computer to execute: a presentation step of presenting a list of a plurality of sets of content including at least a set of content to be delivered by streaming and a set of content to be delivered by downloaded files; an input step of inputting specifying information specifying the set of content to be delivered from the sets of content on the list; and an acquisition step of acquiring the set of content delivered from a content delivering apparatus by way of a network according to delivery information specifying each set of content as one to be delivered by streaming or one to be delivered by downloaded files, the delivery information being provided by the content delivery apparatus by way of the network.

Other objects of the present invention and specific advantages that the present invention provides will become clearer from the description given below by referring to the accompanying drawings that illustrate preferred embodiments of the invention.

BRIEF DESCRIPTION OF THE DRAWINGS

FIG. 10 is a schematic illustration of a startup file for delivery by streaming, showing the structure thereof;

FIG. 13 is a schematic illustration of a startup file to be downloaded, showing the structure thereof;

FIG. 14 is a schematic illustration of a startup file for delivery by streaming to be used with another protocol;

FIG. 22 is another example of image of sales promotion that can be displayed.

BEST MODE FOR CARRYING OUT THE INVENTION

Before describing preferred embodiments of the present invention, the present invention will be summarily described below.

Figure 1:
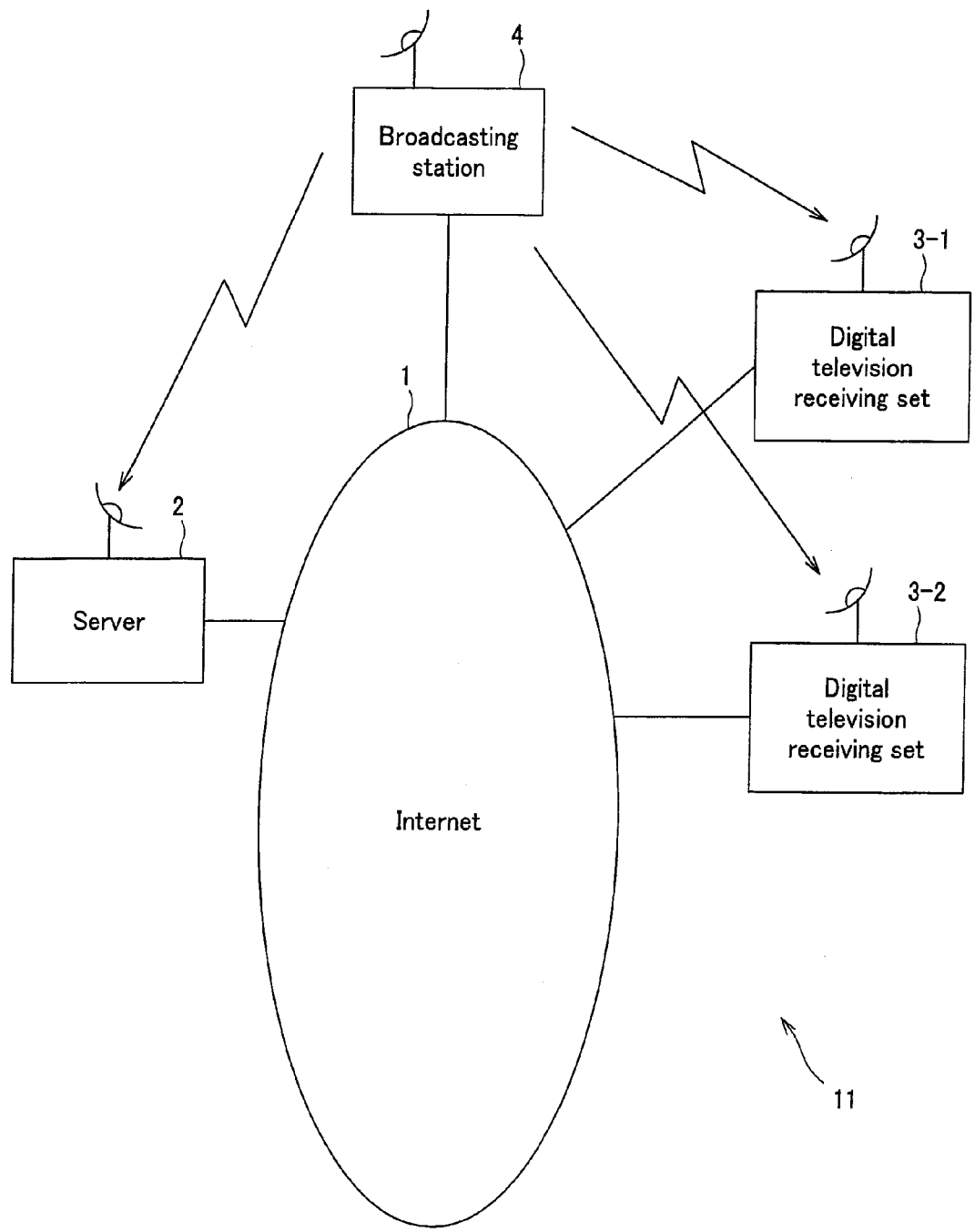
FIG. 1 is a schematic block diagram of a content delivery system according to the invention, showing the configuration thereof.

A content delivery system according to the invention is adapted to deliver content of programs from a content delivery apparatus that may typically operate as server 2 as shown in FIG. 1 to a content processing apparatus, which may typically be a digital television receiving set 3-1 as shown in FIG. 1, by way of a network such as Internet 1 as shown in FIG. 1.

Figure 6:
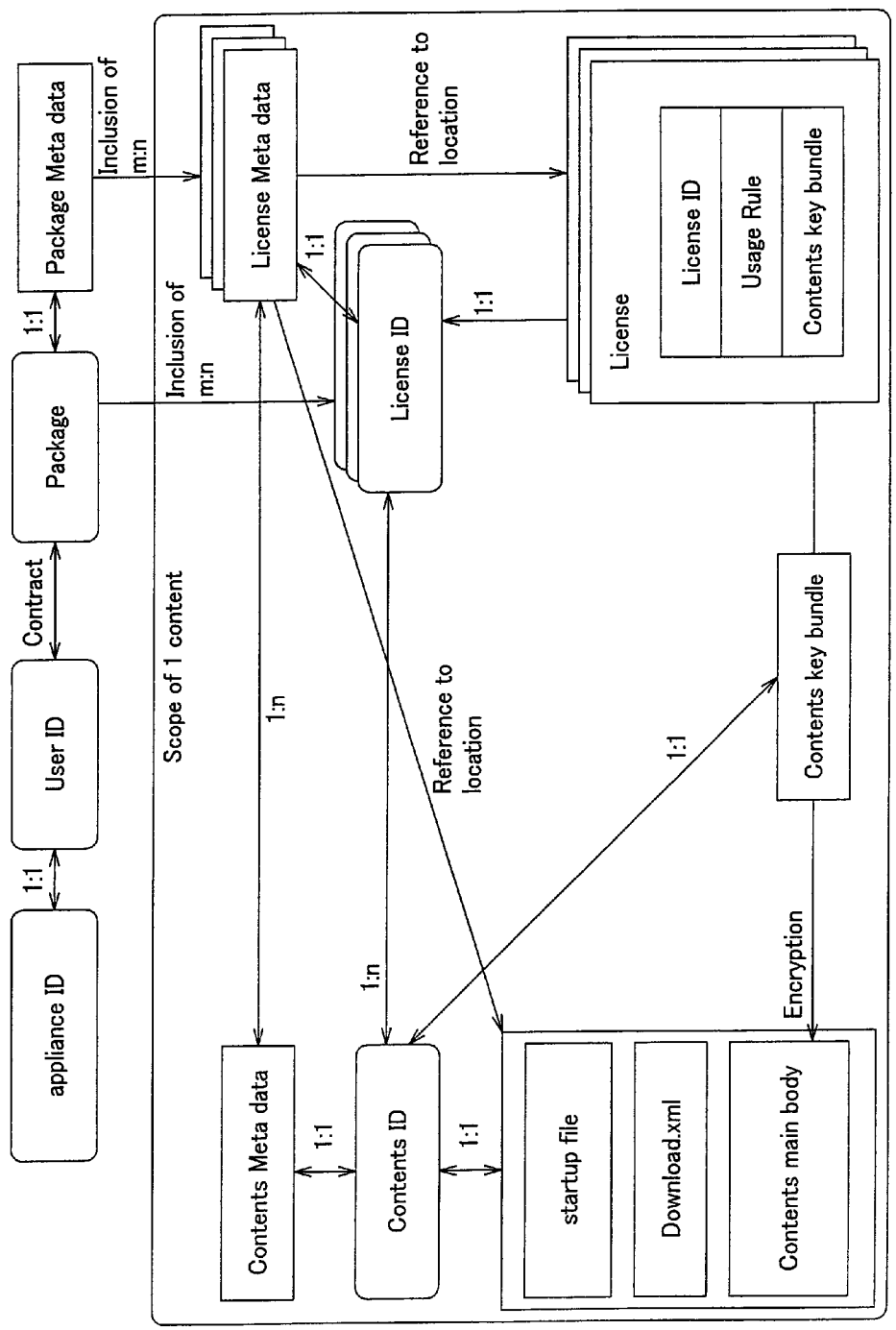
FIG. 6 is a schematic illustration of the relationship between various IDs and metadata.
Figure 18:
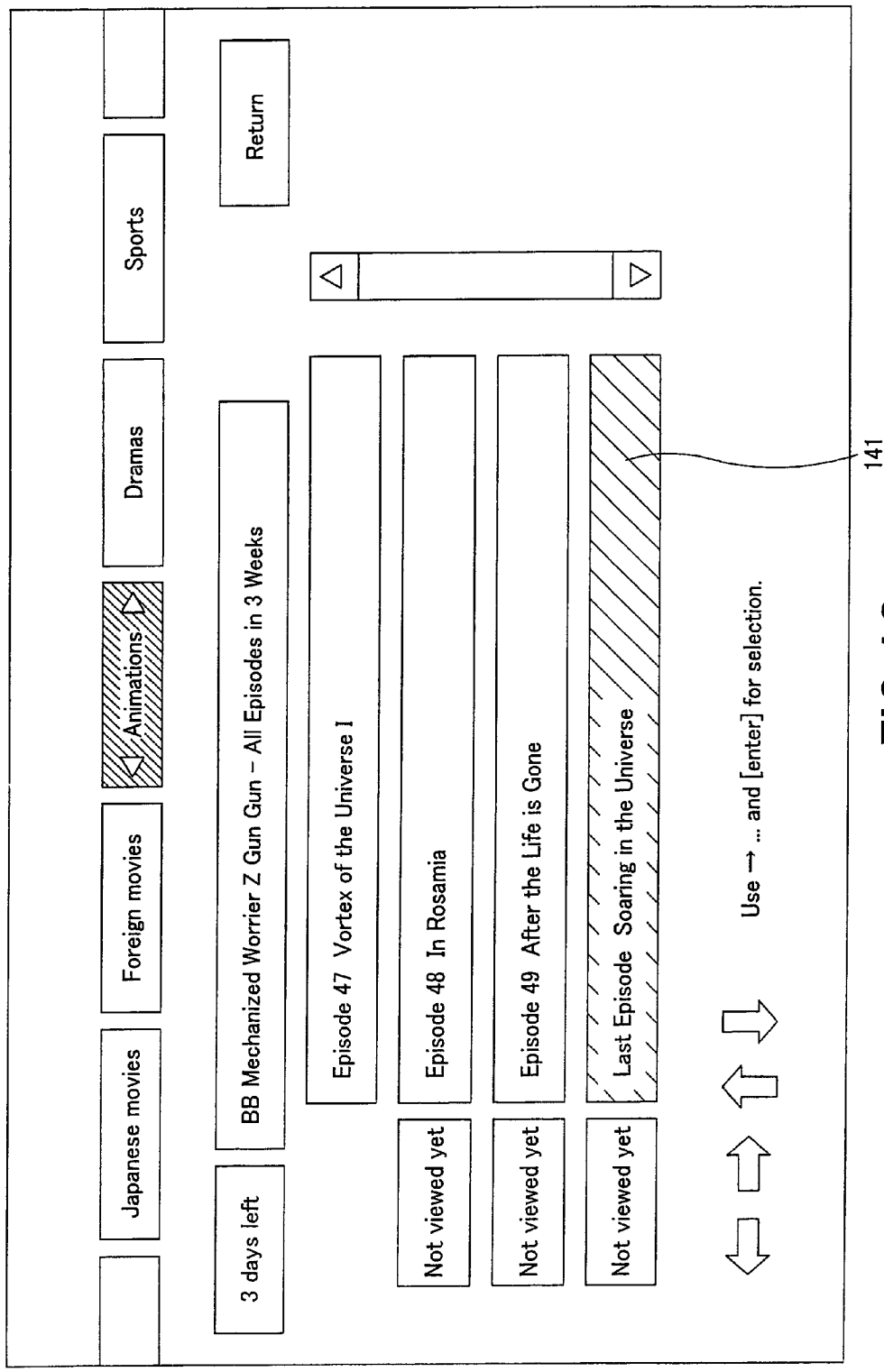
FIG. 18 is an example of list of titles in the package shown in FIG. 17.

A content delivery system according to the invention is so designed as to present a list of a plurality of sets of content including at least a set of content to be delivered by streaming and a set of content to be delivered by downloaded files from a content processing apparatus to the user thereof such as a list of titles in a package as shown in FIG. 18 and input specifying information specifying the set of content to be delivered to the user of the content processing apparatus from the content processing apparatus. For example, the specifying information may indicate that program "the Last Episode: Soaring in the Universe" is specified by means of cursor 141 in FIG. 18. Then, the content processing apparatus acquires the set of content delivered from the content delivering apparatus according to the delivery information provided by the content delivery apparatus by way of a network and specifying the set of content as one to be delivered by streaming or one to be delivered by downloaded files. For example, the delivery information may be contained in a startup file as shown in FIG. 6.

A content delivery method according to the invention is so designed as to deliver content by means of a content delivery system adapted to delivery content from a content delivery apparatus that may typically operate as server 2 to a content processing apparatus, which may typically be a digital television receiving set 3-1 as shown in FIG. 1, by way of a network such as Internet 1 as shown in FIG. 1.

More specifically, the content delivery method so designed as to present a list of a plurality of sets of content including at least a set of content to be delivered by streaming and a set of content to be delivered by downloaded files from a content processing apparatus to the user thereof such as a list of titles in a package as shown in FIG. 18 and input specifying information specifying the set of content to be delivered to the user of the content processing apparatus from the content processing apparatus. For example, the specifying information may indicate that program "the Last Episode: Soaring in the Universe" is specified by means of cursor 141 in FIG. 18. Then, the content processing apparatus acquires the set of content delivered from the content delivering apparatus according to the delivery information provided by the content delivery apparatus by way of a network and specifying the set of content as one to be delivered by streaming or one to be delivered by downloaded files. For example, the delivery information may be contained in a startup file as shown in FIG. 6.

A content processing apparatus according to the invention is so designed as to receive a service of delivering content, which may be television programs, from a content delivery apparatus that may typically operate as server 2 by way of a network such as Internet 1 as shown in FIG. 1.

More specifically, the content processing apparatus comprises a presentation means for presenting a list of a plurality of sets of content including at least a set of content to be delivered by streaming and a set of content to be delivered by downloaded files such as a list of titles in a package as shown in FIG. 18, an input means for inputting specifying information specifying the set of content to be delivered which may, for example, indicate that program "the Last Episode: Soaring in the Universe" is specified by means of cursor 141 in FIG. 18 and an acquisition means for acquiring the set of content delivered from the content delivering apparatus according to the delivery information provided by the content delivery apparatus by way of a network and specifying the set of content as one to be delivered by streaming or one to be delivered by downloaded files. For example, the delivery information may be contained in a startup file as shown in FIG. 6.

For the purpose of the present invention, the delivery information may be correlated with the license of the specified sets of content. More specifically, the set of content that includes a startup file as shown in FIG. 6 shows a one to one correspondence relative to a content ID, a content ID shows a one to n correspondence relative to a license ID and a license ID shows a one to one correspondence relative to a license.

For the purpose of the present invention, the delivery information may further include information for accessing the specified sets of content.

Furthermore, a content processing method according to the invention is so designed as to use a digital television receiving set 3-1 as shown in FIG. 1 to receive a service of delivering content, which may be television programs, from a content delivery apparatus that may typically operate as server 2 by way of a network such as Internet 1 as shown in FIG. 1. The content processing method comprises a presentation step of presenting a list of a plurality of sets of content including at least a set of content to be delivered by streaming and a set of content to be delivered by downloaded files such as a list of titles in a package as shown in FIG. 18, an input step of inputting specifying information specifying the set of content to be delivered which may, for example, indicate that program "the Last Episode: Soaring in the Universe" is specified by means of cursor 141 in FIG. 18 and an acquisition step of acquiring the set of content delivered from the content delivering apparatus according to the delivery information provided by the content delivery apparatus by way of a network and specifying the set of content as one to be delivered by streaming or one to be delivered by downloaded files. For example, the delivery information may be contained in a startup file as shown in FIG. 6.

Finally, a recording medium according to the invention carries therein a recorded program to be executed by a content processing apparatus, which may typically be a digital television receiving set 3-1 for receiving a service of delivering content, which may be television programs, from a content delivery apparatus that may typically operate as server as shown in FIG. 1, by way of a network such as Internet 1 as shown in FIG. 1, the program comprising a presentation step of presenting a list of a plurality of sets of content including at least a set of content to be delivered by streaming and a set of content to be delivered by downloaded files such as a list of titles in a package as shown in FIG. 18, an input step of inputting specifying information specifying the set of content to be delivered which may, for example, indicate that program "the Last Episode: Soaring in the Universe" is specified by means of cursor 141 in FIG. 18 and an acquisition step of acquiring the set of content delivered from the content delivering apparatus according to the delivery information provided by the content delivery apparatus by way of a network and specifying the set of content as one to be delivered by streaming or one to be delivered by downloaded files. For example, the delivery information may be contained in a startup file as shown in FIG. 6.

Now, a content delivery system and a content processing apparatus to be used for such a system according to the invention will be described in greater detail.

Referring to FIG. 1, a content delivery system 11 according to the invention comprises a server 2 and a plurality of digital television receiving sets 3-1, 3-2 that are mutually connected by way of the Internet 1 that is a typical network. A broadcasting station 4 is also connected to the Internet 1. The server 2 receives and keeps television programs broadcast from the broadcasting station 4. Alternatively, the server 2 receives and keeps television programs provided by the broadcasting station 4 by way of the Internet 1. It may needless to say that the server 2 can keep its own programs in addition to the above-described television programs.

Each of the digital television receiving sets 3-1, 3-2 may be arranged in a house, an office or some other place and has a function of receiving the electric wave broadcast from the broadcasting station 4 so that the viewer thereof may view any of the television programs it receives. Additionally, it has a function of receiving programs provided by the server 2 so that the viewer thereof may view any of them.

While FIG. 1 shows a server 2 and two digital television receiving sets 3-1, 3-2, the system may comprise a plurality of servers 2 and the number of digital television receiving sets may generally be greater than two. In other words, there may generally be more digital television receiving sets other than the digital television receiving sets 3-1, 3-2 shown in FIG. 1.

Note that the digital television receiving sets 3-1, 3-2 are referred to simply as digital television receiving sets 3 when it is not necessary to discriminate them.

Figure 2:
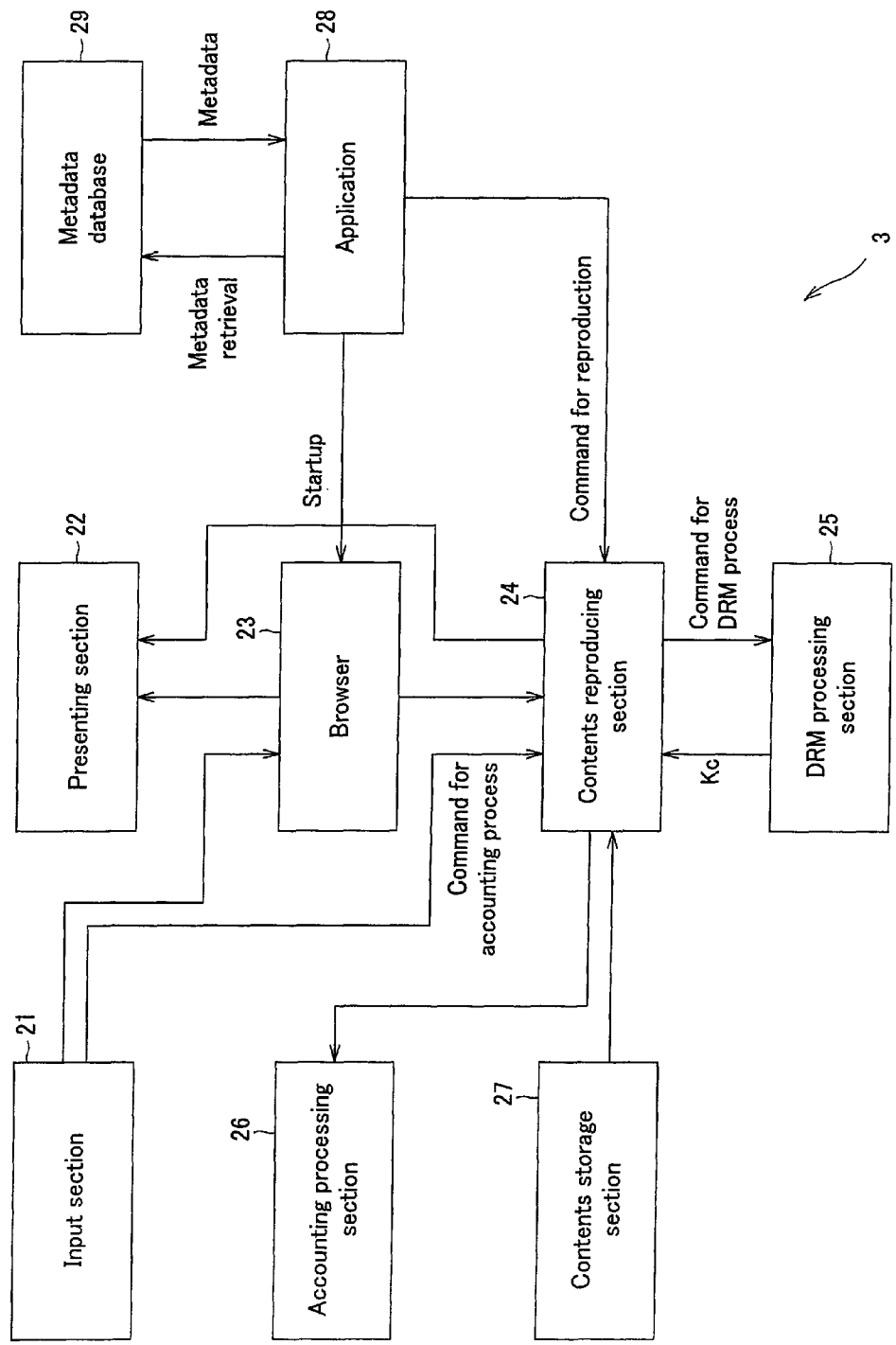
FIG. 2 is a schematic block diagram of a digital television receiving set operating as a component of the content delivery system, showing the functional structure thereof.

FIG. 2 is a schematic block diagram of a digital television receiving set 3 operating as a component of a content delivery system 11 according to the invention as shown in FIG. 1, showing the functional structure thereof.

Referring to FIG. 2, the digital television receiving set 3 comprises an input section 21 and various commands are input by the user by way of the input section 21. The digital television receiving set 3 further comprises a presentation section 22 that displays the images of programs and outputs the corresponding sounds. Additionally, the presentation section 22 presents other various pieces of information to the user.

Referring again to FIG. 2, browser 23 presents an HTML (hyper text markup language) document (including CSS (cascading style sheets) and executes the script contained in the HTML document. Additionally, the browser 23 presents a BML (broadcast markup language) document (including CSS) and executes the script contained in the BML. Still additionally, it can deal with the XrML (extensible rights markup language) of ContentGuard, Inc.

A content reproducing section 24 is realized by software, which may typically be Media Player (tradename, available from Microsoft), and controls and implements the operation of reception of content through reproduction thereof. The content reproducing section 24 also implements various control operations incorporated in the digital television receiving set 3 other than the processing operations of markup languages.

A DRM (digital right management) processing section 25 communicates with the DRM server 74 (see FIG. 4) of the server 2 and acquires licenses relating to content and manages them in the digital television receiving set 3. Since the DRM processing section 25 supplies key Kc for decrypting encrypted data to the content reproducing section 24, it may be integrated typically with the content reproducing section 24 in order to securely manage the key Kc.

An accounting processing section 26 executes accounting processes that may vary depending on the accounting system involved in the process such as an electronic money system or a prepayment system. Content storage section 27 is typically formed by using a hard disc so as to store the content provided by the content server 75 (FIG. 4) of the server 2.

Figure 4:
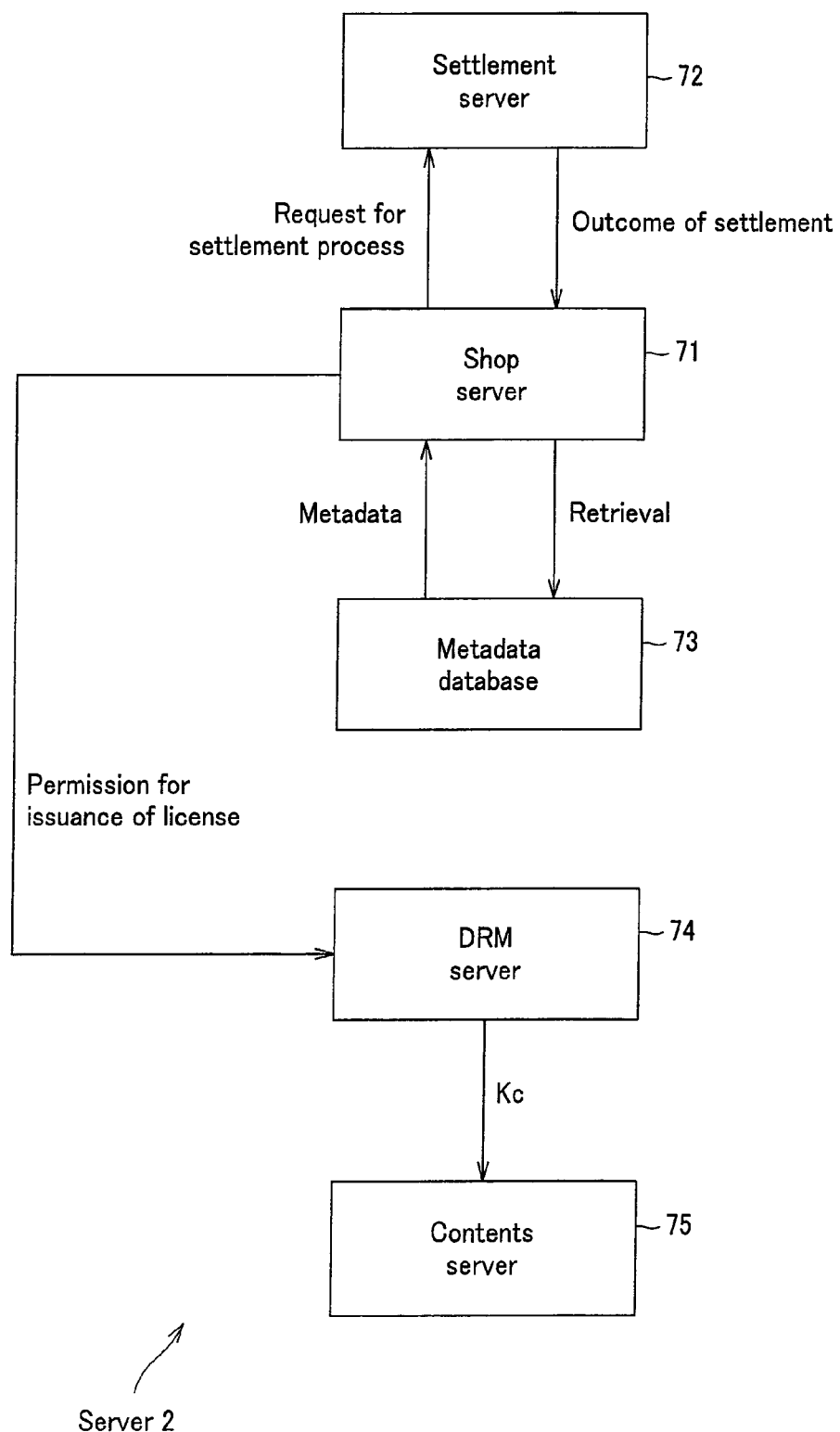
FIG. 4 is a schematic block diagram of the server operating as a component of the content delivery system.

An application 28 comprises various pieces of software and controls various operations of the digital television receiving set 3. Metadata database 29 keeps the metadata supplied from the metadata database 73 of the server 2 (FIG. 4).

The input section 21 outputs a signal that corresponds to the input by the user to the browser 23 and the content reproducing section 24. The presenting section 22 presents the information provided from the browser 23 or the content reproducing section 24. The content reproducing section 24 reads out the required content from the content storage section 27. Whenever necessary, the content reproducing section 24 issues instructions for an accounting process to the accounting processing section 26. The DRM processing section 25 executes a DRM process according to the instructions for the DRM process from the content reproducing section 24 and subsequently outputs the key Kc that is necessary for decrypting the encrypted content to the content reproducing section 24.

The application 28 is adapted to start up the browser 23 for an operation and executes a process for issuing instructions necessary for reproducing content to the content reproducing section 24. Additionally, it issues instructions for retrieving metadata to the metadata database 29 and acquires the metadata obtained as a result of the retrieving operation.

Figure 3:
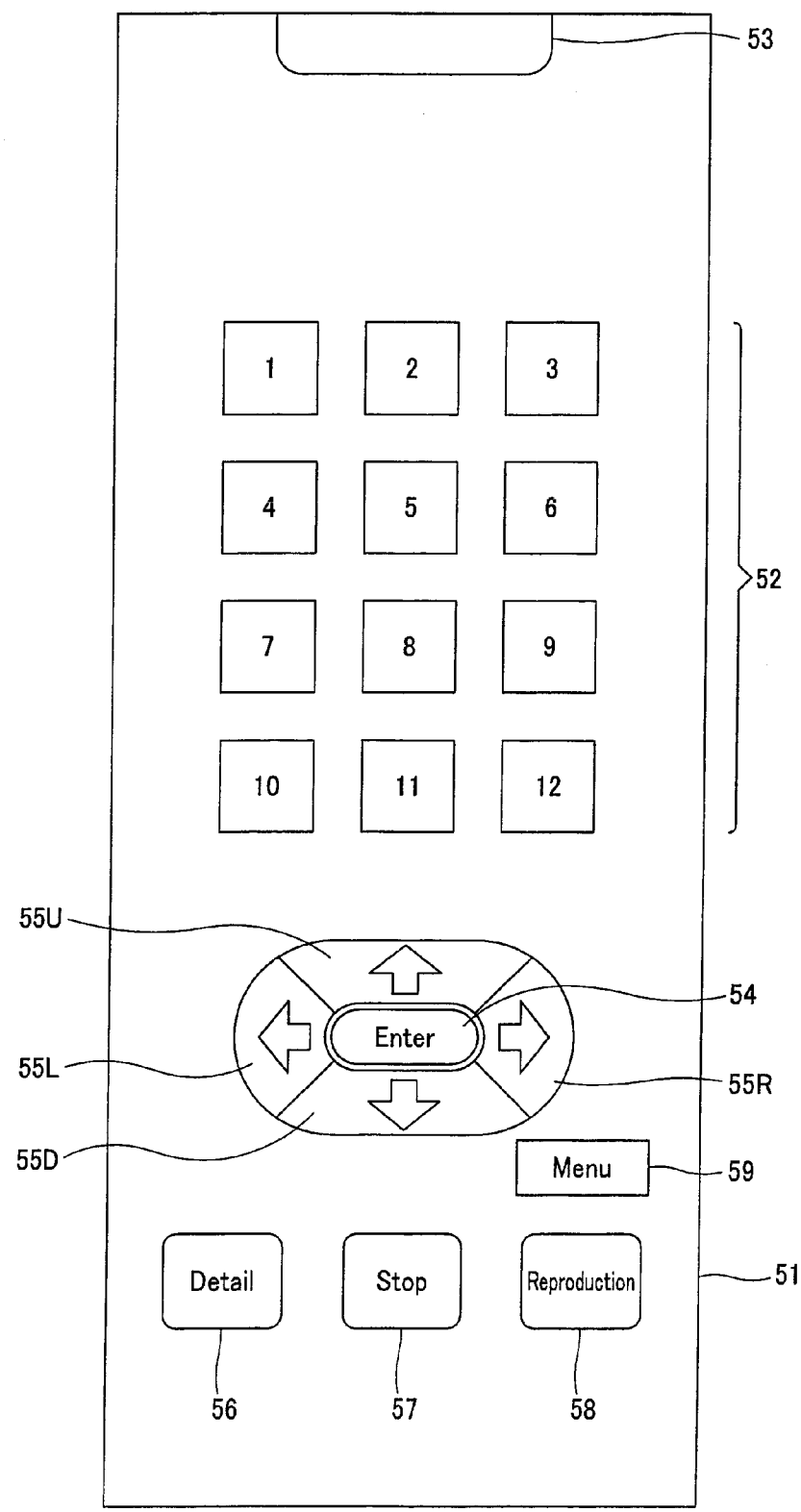
FIG. 3 is a schematic front view of a remote commander for remotely operating a digital television receiving set that operates as component of the content delivery system.

The digital television receiving section 3 executes various operations according to the instructions from remote commander 51 as shown in FIG. 3. The remote commander 51 has number buttons 52 for numbers 1 through twelve. The remote commander 51 is also provided at the front end thereof with a generating section 53 for generating an infrared signal according to a corresponding button operation by the user.

In FIG. 3, direction buttons 55U, 55D, 55L and 55R that are operated by the user for moving the cursor on the presenting section 22 upward, downward, leftward and rightward respectively are arranged below the number buttons 52 and an enter button 54 to be operated for finalizing an input operation is arranged at the center of the direction buttons.

In FIG. 3, a detail button 56, a stop button 57 and a reproduction button 58 are arranged at a lower part of the remote commander 51. The detail button 56 is operated by the user when he or she gives instructions for displaying detailed information of the information that is being displayed. The stop button 57 is operated by the user when he or she stops the ongoing reproduction of content. The reproduction button 58 is operated by the user when he or she gives instructions for reproducing content. A menu button 59 is arranged above the reproduction button 58 so as to be operated by the user when he or she wants a menu to be displayed.

Although not shown in FIG. 3, the remote commander 51 may be further provided with various buttons to which various functions are assigned respectively.

FIG. 4 is a schematic block diagram of the server 2, illustrating the configuration thereof. The server 2 of the present invention includes a shop server 71, a settlement server 72, a metadata database server 73, a DRM server 74 and a content server 75.

Figure 5:
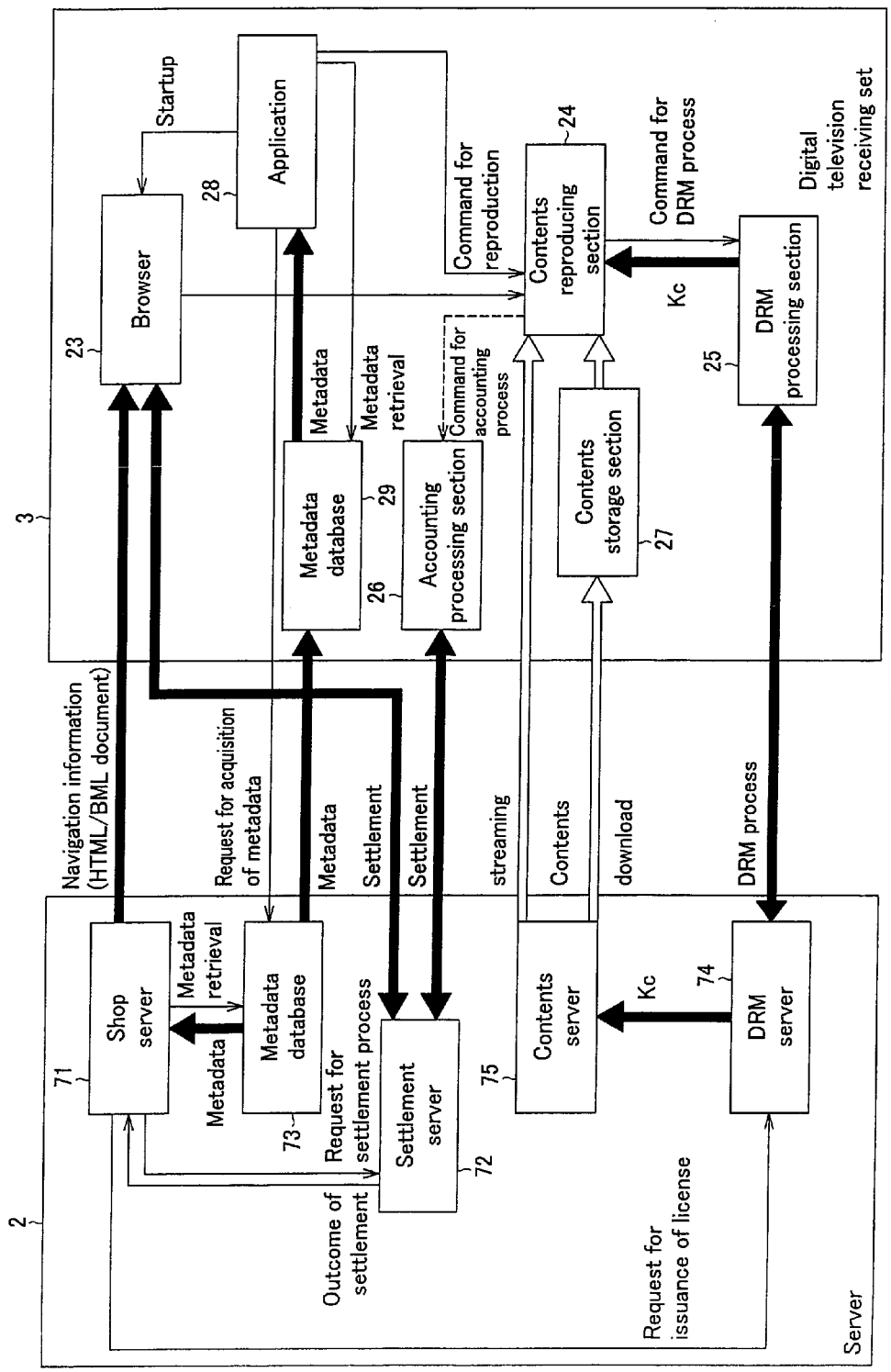
FIG. 5 is a schematic illustration of information that can be exchanged between a digital television receiving set and the server that operate as so many components of the content delivery system.

The above listed components of the server 2 exchanges information respectively with the corresponding sections of the digital television receiving set 3 as shown in FIG. 5.

When the shop server 71 is accessed from the browser 23 by way of the Internet 1, it provides navigation information including an HTML document and a BML document to the browser 23. The settlement server 72 communicates with the browser 23 or the accounting processing section 26 to settle an account. The settlement server 72 executes a settlement process according to a request for the settlement process from the shop server 71 and outputs the outcome of the settlement to the shop server 71.

The metadata database 73 reads out the metadata requested by the application 28 out of the metadata it stores according to a metadata acquisition request from the application 28 and supplies them to the metadata database 29 of the digital television receiving set 3 so as to have it stores them.

The metadata database 73 also supplies the metadata obtained as a result of a retrieving operation according to a metadata retrieval request from the shop server 71 to the latter.

The DRM server 74 communicates with the DRM processing section 25 of the digital television receiving set 3 according to a license issuance request from the shop server 71 and executes a DRM process. The DRM process includes an authentication process of verifying that the user is a proper user having a license, a process for providing/acquiring the key Kc required for decrypting the corresponding encrypted data and other processes necessary for managing copy rights. When a DRM process is executed properly, the DRM server 74 supplies the content server 75 with a key Kc necessary for decrypting the corresponding content. Additionally, when a DRM process is executed properly, the DRM server 74 supplies a corresponding key Kc to the DRM processing section 25 of the digital television receiving set 3.

The content server 75 encrypts content data by means of the key Kc supplied from the DRM server 74 and delivers them to the content reproducing section 24 by streaming or to the content storage section 27 as a downloaded file so as to have it store them.

While the server 2 includes a plurality of servers in the instance of FIGS. 4 and 5, it is also possible to compose the server 2 of a single server.

FIG. 6 is a schematic illustration of the relationship among various pieces of information relating to settlements, DRM processes and reproductions. As shown in FIG. 6, an appliance ID and a user ID show a one to one correspondence. The appliance ID is an ID assigned to the digital television receiving set 3 and the user ID is an ID assigned to the user who uses the digital television receiving set 3. Thus, the digital television receiving set 3 and the user are identified by these IDs.

The user to whom a predetermined user ID is assigned concludes a contract with a manager of the server 2 for the purchase of a package as a commodity. More specifically, the user purchases a television program he or she wants as a package out of the television programs provided by the server 2. The package shows a one to one correspondence relative to a package metadata.

Each package contains one or more than one sets of content. Each set of content comprises a content main body, Download. xml that is a management information file for downloading and a startup file. The content main body refers to content data of a television program.

Download. xml that is a management information file is prepared when the content is to be downloaded. It includes therein a directory and file names. A download operation is completed when all the files listed in the directory are received.

A startup file contains information of the type of delivery that tells if the set of content to be delivered needs to be delivered by downloaded files or by streaming. A startup file will be described in greater detail hereinafter by referring to FIG. 10.

Figure 7:
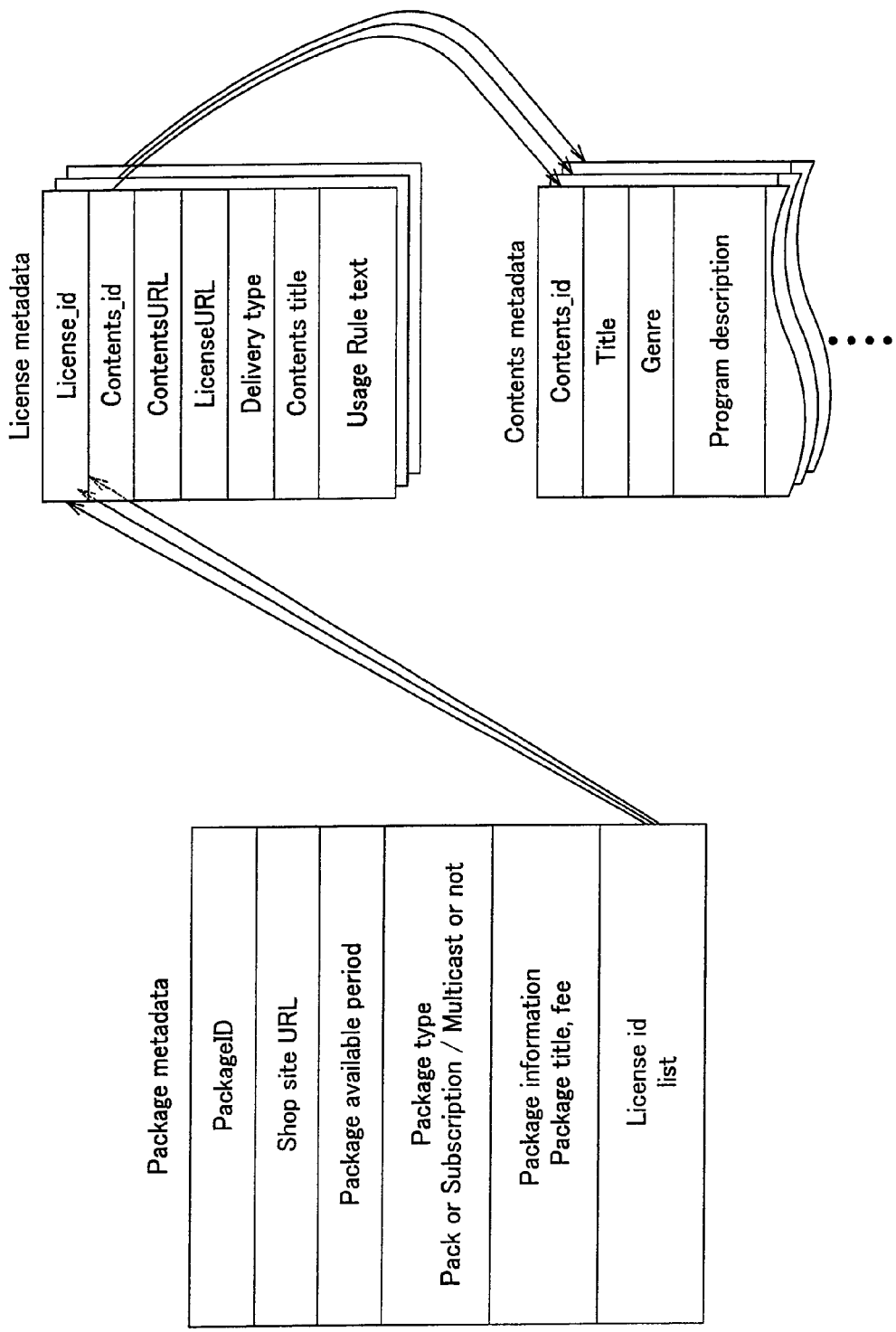
FIG. 7 is a schematic illustration of the relationship among package metadata, license metadata and content metadata.

A set of content shows a one to one correspondence relative to a content ID. The set of content is identified by the content ID. Additionally, the content ID shows a one to one correspondence relative to a content metadata. As shown in FIG. 7, a content metadata contains a content ID, a title, a genre name and a description of a television program.

A total of n (n being an integer not smaller than 1) license IDs are correlated to a content ID. Similarly n license metadata are correlated to a single content metadata.

The license ID is used to identify the license that is made to show a one to one correspondence relative to it. Each license is composed of a license ID, a usage rule and a bundle of content keys. A bundle of content keys (which corresponds to the key Kc shown in FIG. 5) is a bundle of keys that includes an appropriate number of keys required for decrypting the set of content for which the license is effective and shows a one to one correspondence relative to the content ID.

A license metadata shows a one to one correspondence relative to a license ID. As shown in FIG. 7, a license metadata includes a license ID, a content ID, a content URL (uniform resource locator), a license URL, the type of delivery, the title of a set of content and the text of a usage rule.

The license metadata and the content metadata are made to show an n to one correspondence relative to each other by the content ID included therein.

The content URL of the license metadata indicates the accessing target for acquiring the content. The license URL indicates the accessing target for acquiring the license. The type of delivery indicates that the sets of content to be licensed are to be delivered by streaming or by downloaded files.

A package is made to show an m to n correspondence (n being an integer not smaller than 1 like m) relative to a license ID. Similarly, a package metadata is made to show an m to n correspondence relative to a license metadata.

As shown in FIG. 7, a package metadata is composed of a package ID, a shop site URL, a package utilization period, a package type, package information and a license ID list.

A package ID is a piece of information for identifying a package. A shop site URL indicates the accessing target of the shop site for acquiring the package. The package utilization period indicates the period during which the package can be utilized.

The package type indicates if the package is a pack or a subscription. Additionally, the package type indicates if the package is a multicast or not. A pack is a package that contains a predetermined appropriate number of programs. With a subscription, the user can view the programs of a predetermined channel for a predetermined number of days. A multicast indicates that the package is provided to many and unspecified users free or on a fee charging basis.

Package information includes the title of the package and the fee charging system. The license ID list describes the license IDs of the licenses contained in the package.

The package metadata corresponds to the license metadata that by turn corresponds to the license IDs described therein.

Now, the process of reproducing a set of content on the server 2 will be described below by referring to the flow chart of FIG. 8.

Figure 8:
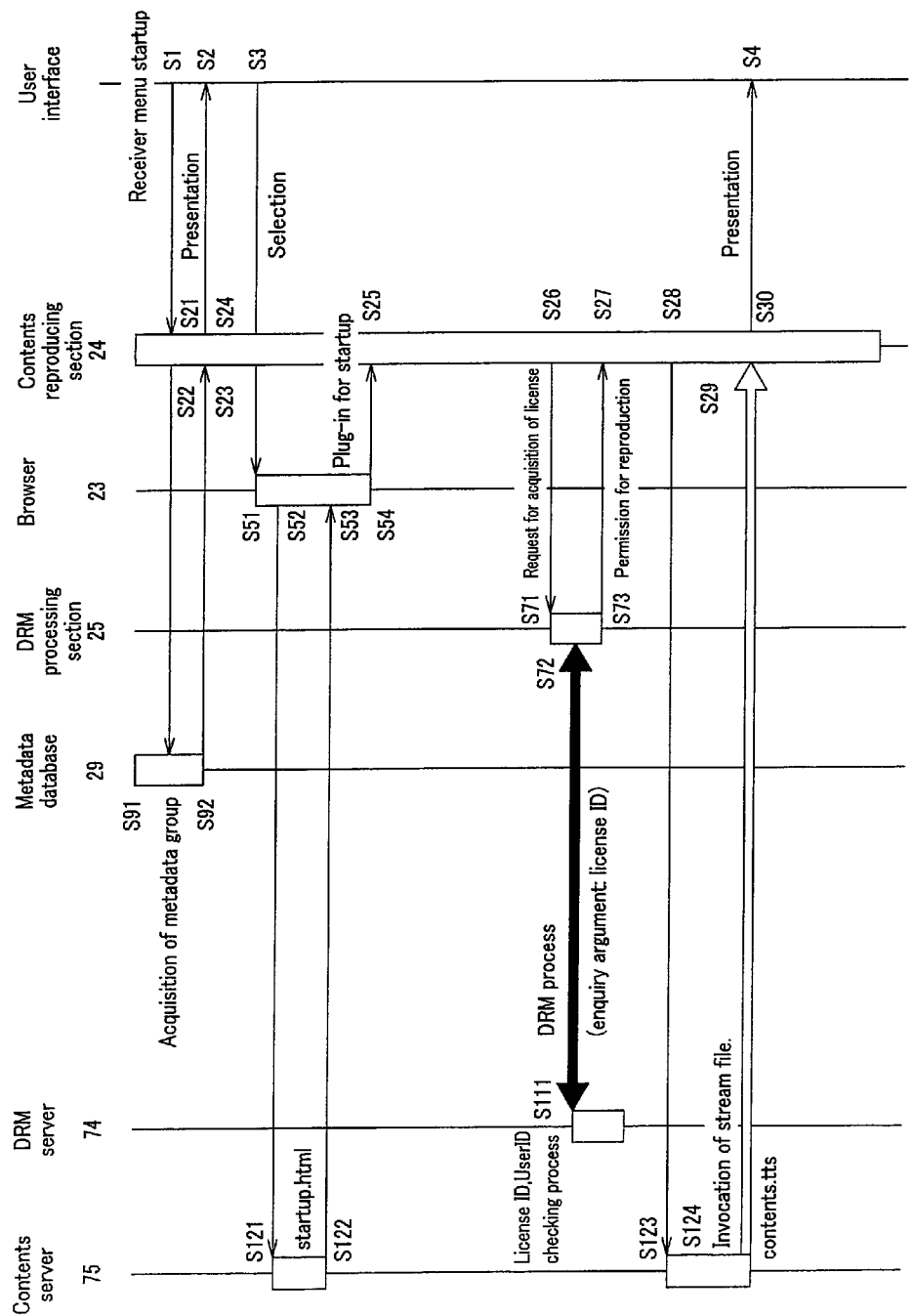
FIG. 8 is a flow chart of the operation of a digital television receiving set when receiving from the server content that are delivered by streaming.

Note that, it is necessary for the digital television receiving set 3 to acquire a metadata from the server 2 before executing the process of FIG. 8. The process for acquiring a metadata is shown in the flow chart of FIG. 9.

Figure 9:
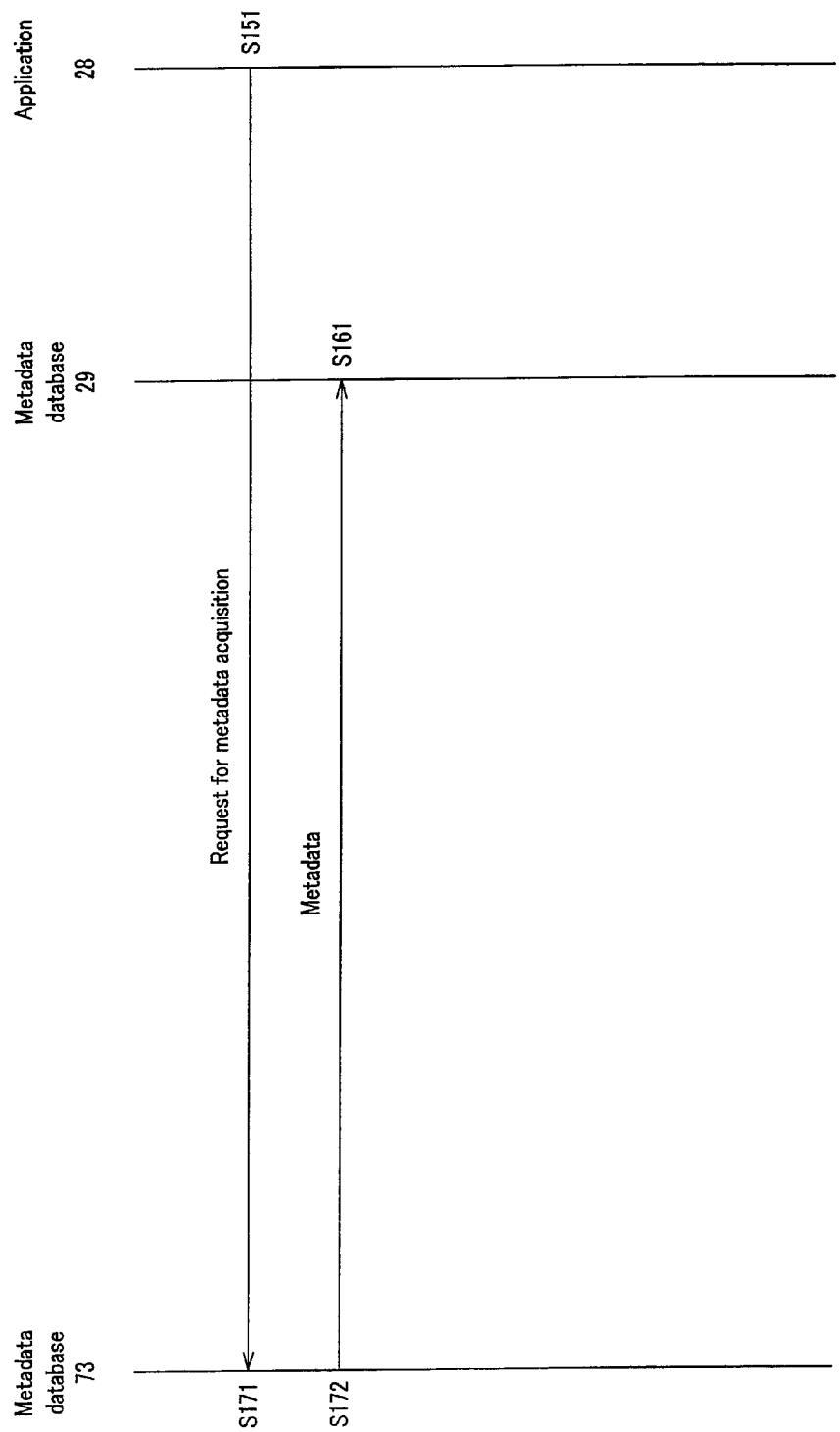
FIG. 9 is a flow chart of the processing operation that is a prerequisite for the processing operation of FIG. 8.

Referring firstly to FIG. 9, the application 28 accesses the metadata database 73 by way of the Internet 1 according to the command from the user and requests to acquire the metadata in Step S151. Then, as the metadata database 73 is accessed by the application 28 in Step S171, it reads out the metadata relating to the requested set of content in Step S172 and supplies the metadata to the metadata database 29 of the digital television receiving set 3 by way of the Internet 1. The metadata database 29 receives and stores the metadata in Step S161.

As a result of the above process, the metadata database 29 of the digital television receiving set 3 keeps the metadata in advance. The metadata includes a package metadata, a license metadata and a content metadata as shown in FIG. 6.

The process illustrated in FIG. 8 is executed in a state where the metadata is held in the metadata database 29 in a manner as described above. Note that the user interface shown in FIG. 8 comprises an input section 21 and a presenting section 22 shown in FIG. 2.

The user issues a command for starting up the menu of the digital television receiving set 31 by operating the menu button 59 of the remote commander 51. Then, in Step S1, the input section 21 by turn issues a command for starting up the menu to the content reproducing section 24. In Step S21, the content reproducing section 24 receives the command from the input section 21 and, in Step S22, it issues a command for reading out the metadata already stored in the metadata database 29 to the latter.

In Step S91, the metadata database 29 receives the command from the content reproducing section 24 and, in Step S92, it reads out metadata that is stored in advance and supplies it to the content reproducing section 24.

In Step S23, the content reproducing section 24 receives the metadata supplied from the metadata database 29 and, in Step S24, it reads out the titles of the sets of content (programs) described therein and supplies them to the presenting section 22 that operates as user interface. In Step S2, the presenting section 22 displays a list of the sets of content supplied from the content reproducing section 24.

Then, the user views the displayed list and selects a program he or she wants, operating one or more than one appropriate direction buttons 55U through 55R and the enter button 54 of the remote commander 51. In Step S3, the input section 21 supplies a selection signal that corresponds to the operation carried out by the user (information specifying the selected program) to the browser 23.

In Step S51, the browser 23 receives the signal indicating the selected program from the input section 21 and, in Step S52, it requests the content server 75 to supply the startup file that corresponds to the program (set of content). The request includes the content ID for identifying the set of content.

In Step S122, the content server 75 reads out the startup file of the set of content that corresponds to the specified content ID and transmits it to the browser 23.

In Step S53, the browser 23 receives the startup file (startup. html) from the content server 75.

FIG. 10 is a schematic illustration of a startup file that can be received in this way, showing the configuration thereof. As shown in FIG. 10, the startup file describes that the content ID of the selected set of content is "content_ID1" and that the type of delivery of the set of content is delivery by streaming ([content="stream"]).

The startup file further describes that the delivery jumps to the URL that is described next after the elapse of a second and [http://content_server.ssny.co.jp/samplet.tts] is specified for the URL.

In Step S54, the browser 23 starts up the content reproducing section 24 by means of a plug in operation.

In Step S25, the content reproducing section 24 starts operating and, in Step S26, it requests the DRM processing section 25 to acquire a license.

In Step S71, the DRM processing section 25 receives the request for acquiring a license from the content reproducing section 24 and, in Step S72, it accesses the DRM server 74 and requests it to execute a DRAM process. At this time, the license ID for the set of content to be reproduced by the content reproducing section 24 and the user ID are added to the DRM server 74 as arguments.

In Step S111, the DRM server 74 executes the DRM process according to the request from the DRM processing section 25. Then, the DRM server 74 checks if the user has already acquired a license on the basis of the license ID and the user ID supplied from the DRM processing section 25. While the checking process will not be described in greater detail, the user is required to acquire a license in advance in order to reproduce the set of content. The DRM server 74 stores the license ID for identifying the license issued to the user and the user ID of the user. If the license ID and the user ID that are supplied from the DRM processing section 25 are already registered in a list, the user is determined to be an authorized user. If the license ID and the user ID are not registered in the list to show a proper correspondence, the user is determined to be not the user who purchased the license properly. The DRM server 74 notifies the DRM processing section 25 of the outcome of the checking process.

In Step S72, the DRM processing section 25 receives the outcome of the checking process from the DRM server 74 and determines if the user is to be authorized for reproduction of the set of content or not according to the received outcome. Then, in Step S73, the result of the determination is supplied from the DRM processing section 25 to the content reproducing section 24.

If the notice received from the DRM processing section 25 does not authorize the user for reproduction of the set of content, the content reproducing section 24 suspends the reproducing process in Step S27. If, on the other hand, the notice received from the DRM processing section 25 authorizes the user for reproduction of the set of content (the notification contains the key Kc required for reproducing the set of content), the content reproducing section 24 accesses the content URL (FIG. 7) that describes the license metadata of the license in Step S28. In the instance of this example, the URL indicates that the set of content is kept by the content server 75.

In Step S123, the content server 75 is accessed by the content reproducing section 24 and, in Step S124, it reads out the data of the content main body described in the content URL and delivers them to the content reproducing section 24 by streaming.

In Step S29, the content reproducing section 24 receives the delivery of the content data by streaming from the content server 75 and, in Step S30, it decrypts the encrypted content data by means of the Key Kc and supplies them to the presenting section 22 that operates as user interface. In Step S4, the presenting section 22 displays the content data that are delivered from the content reproducing section 24 by streaming.

Thus, the process of delivering the set of content specified by the user by streaming is executed in the above described manner.

The process of delivering content from the content server 75 by streaming is described above. Now, the process of downloading content to the digital television receiving set 3 in advance so as to be stored as files and reproduced later will be discussed below.

Figure 12:
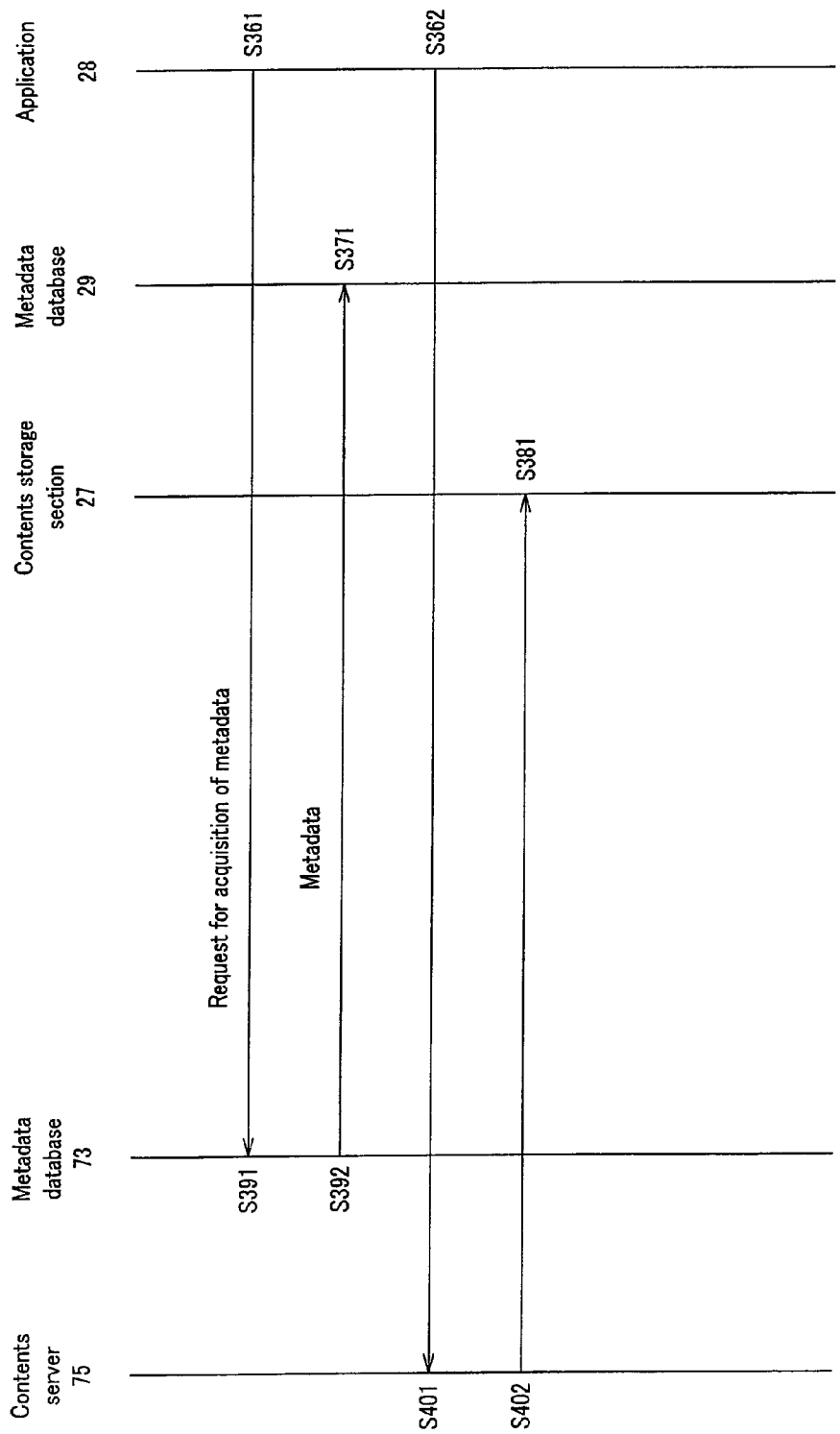
FIG. 12 is a flow chart of the operation that is a prerequisite for the processing operation of FIG. 11.

In this instance, the digital television receiving set 3 has to download content data in advance. This process will be described by referring to the flow chart of FIG. 12.

In Step S361, the application 28 accesses the metadata database 73 and requests to acquire metadata. In Step S391, the metadata database 73 receives the request and, in Step S392, it reads out the metadata of the corresponding set of content and transmits the read out metadata to the metadata database 29 of the digital television receiving set 31. In Step S371, the metadata database 29 stores the metadata supplied from the metadata database 73.

The above process is same as the process from Step S151 to Step S172 described above by referring to FIG. 9.

Then, in Step S362, the application 28 accesses the content server 75 and requests transmission of content according to a corresponding command from user. In Step S401, the content server 75 that has received the request reads out the content requested in Step S402 and transmits them to the content storage section 27. In Step S381, the content storage section 27 receives the content transmitted from the content server 75 and stores them.

In this way, the content that correspond to the metadata are stored in advance both in the metadata database 29 and the content storage section 29.

Figure 11:
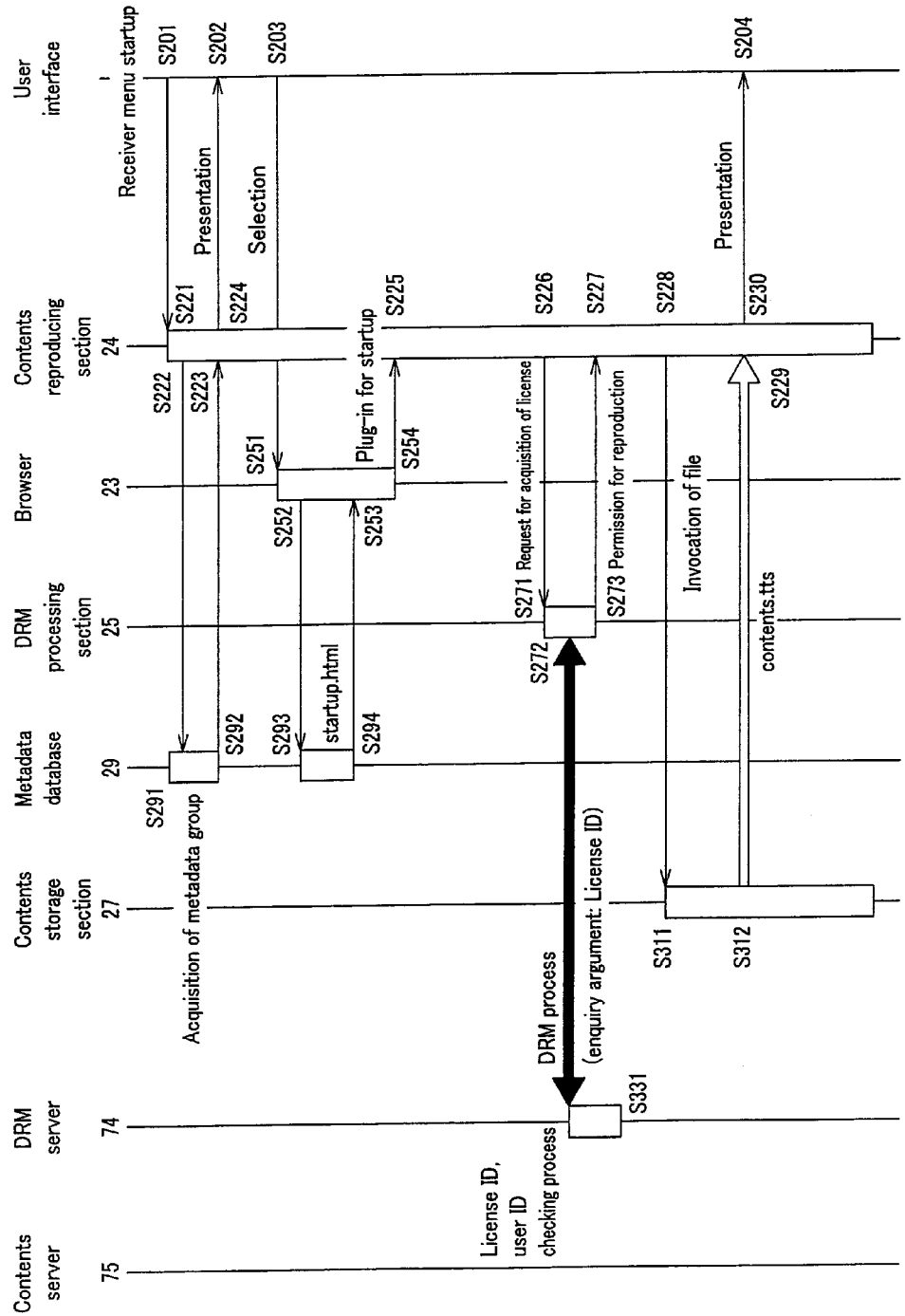
FIG. 11 is a flow chart of the operation of reproducing a file that is stored in advance.

The process illustrated in FIG. 11 is executed in a state where the metadata and the content is stored in advance in a manner as described above.

In Step S201, the input section 21 issues a command for starting up the menu to the content reproducing section 24 according to a corresponding command from the user that is issued when the user operated the menu button 59. In Step S221, the content reproducing section 24 receives the menu startup command from the input section 21 and, in Step S222, it by turn issues a command for reading metadata to the metadata database 29.

In Step S291, the metadata database 29 receives the command from the content reproducing section 24 and, in Step S292, it reads out the metadata that is stored in advance and outputs it to the content reproducing section 24.

In Step S223, the content reproducing section 24 receives the metadata from the metadata database 29 and, in Step S224, it reads out the titles of sets of content and outputs them to the presenting section 22. In Step S202, the presenting section 22 that operates as user interface receives the presented program titles from the content reproducing section 24 and presents them to the user.

Then, the user views the displayed program titles and selects the program that he or she wants to reproduce by operating the remote commander 51. In Step S203, the input section 21 supplies information that specifies the set of content specified by the user to the browser 23.

In Step S221, the browser 23 receives the selection from the input section 21 and, in Step S222, it supplies the content ID of the selected program (set of content) to the metadata database 29 and requests transmission of the corresponding startup file.

In Step S293, the metadata database 29 receives the request from the browser 23 and, in Step S294, it reads out the startup file that corresponds to the set of content and supplies it to the browser 23.

In Step S253, the browser 23 receives the startup file supplied from the metadata database 29.

FIG. 13 illustrates an example of a startup file that the browser 23 may receive in the above-described manner. In this example, the type of delivery of content is "download" and the content ID is "content_ID2". In this example, again, the startup file further describes that the delivery jumps to the URL that is described next after the elapse of a second.

Since the destination of the jump is an MPEG-2TS file, it issues a command for starting up the content reproducing section 24 by means of a plug in operation in Step S254.

In Step S225, the content reproducing section 24 starts operating according to the command from the browser 23 and, in Step S226, it issues a request for acquiring license to the DRM processing section 25. In Step S271, the DRM processing section 25 receives the request for acquiring a license from the content reproducing section 24 and, in Step S272, it communicates with the DRM server 74 and requests it to execute a DRM process. In Step S331, the DRM server 74 executes the DRM process according to the request from the DRM processing section 25. This process is same as the process of Step S111 in FIG. 8.

In Step S272, the DRM processing section 25 receives the outcome of the DRM process from the DRM server 74 and, in Step S273, it notifies the content reproducing section 24 of the outcome of the process.

If the received notice does not authorize the user for reproduction of the set of content, the content reproducing section 24 suspends the reproducing process. If, on the other hand, the received notice authorizes the user for reproduction of the set of content, the content reproducing section 24 issues a command for reading out the file of the set of content specified in Step 228 for reproduction.

In the instance of this example, the URL indicates that the set of content is stored in the content storage section 27. Therefore, in Step S311, the content storage section 27 receives the command for reading out the file from the content reproducing section 24 and, in Step S312, it reads out the data of the specified file and supplies it to the content reproducing section 24.

In Step S229, the content reproducing section 24 receives the input of the data and, in Step S230, it outputs the data to the presenting section 22 that operates as user interface.

In Step S204, the presenting section 22 receives the data from the content reproducing section 24 and displays them.

The content stored in the content storage section 27 of the digital television receiving set 3 in advance are reproduced in the above-described manner.

While the both files of the instances illustrated in FIGS. 10 and 13 are described by the scheme name of http (hypertext transfer protocol), a scheme name such as rtp (real-time transport protocol) may alternatively be used. What is required essentially is that the resource type is expressed on the basis of the related protocol.

Figure 15:
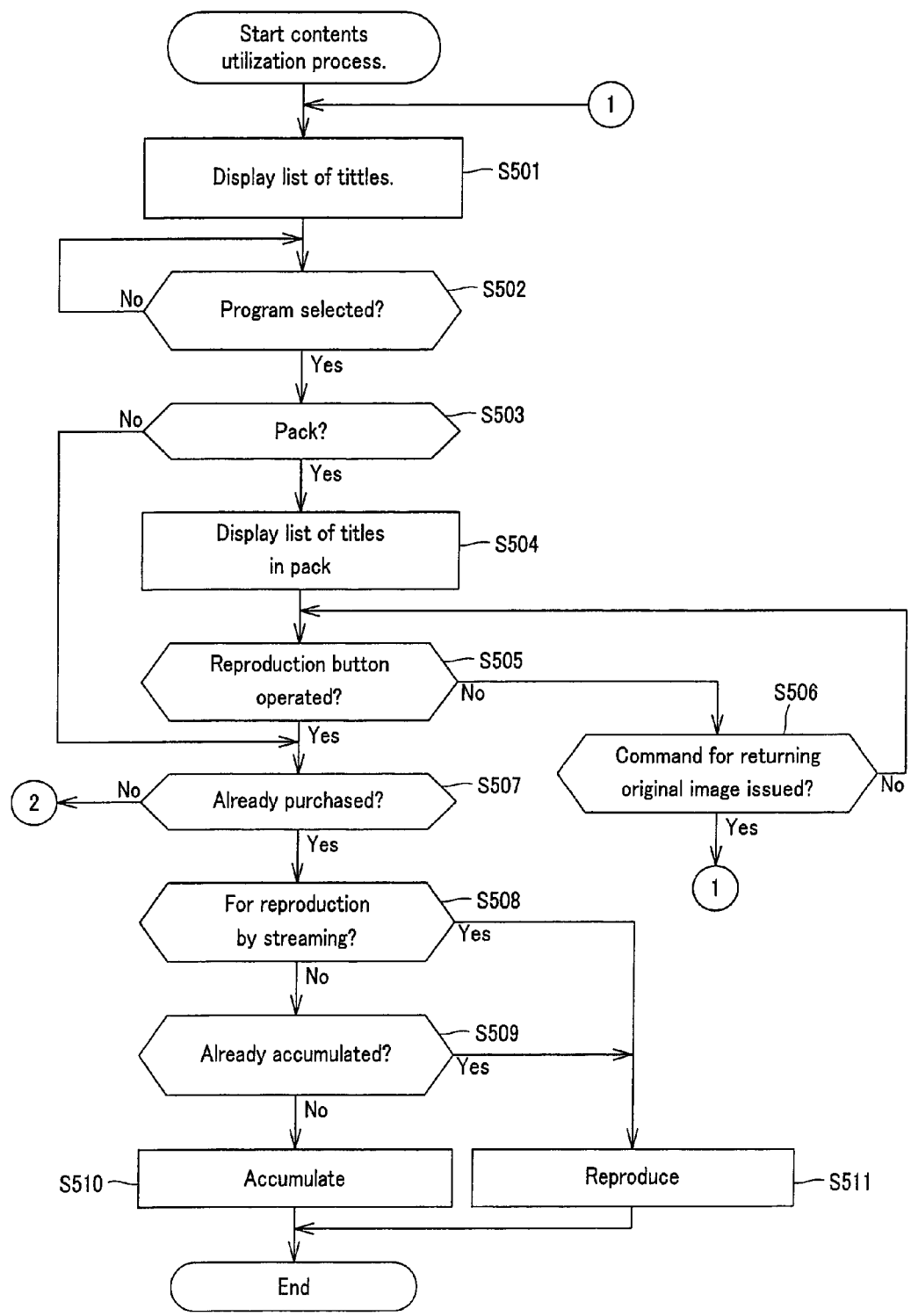
FIG. 15 is part of a flow chart of the processing operation for utilizing content by a digital television receiving set that is a component of a content delivery system.
Figure 16:
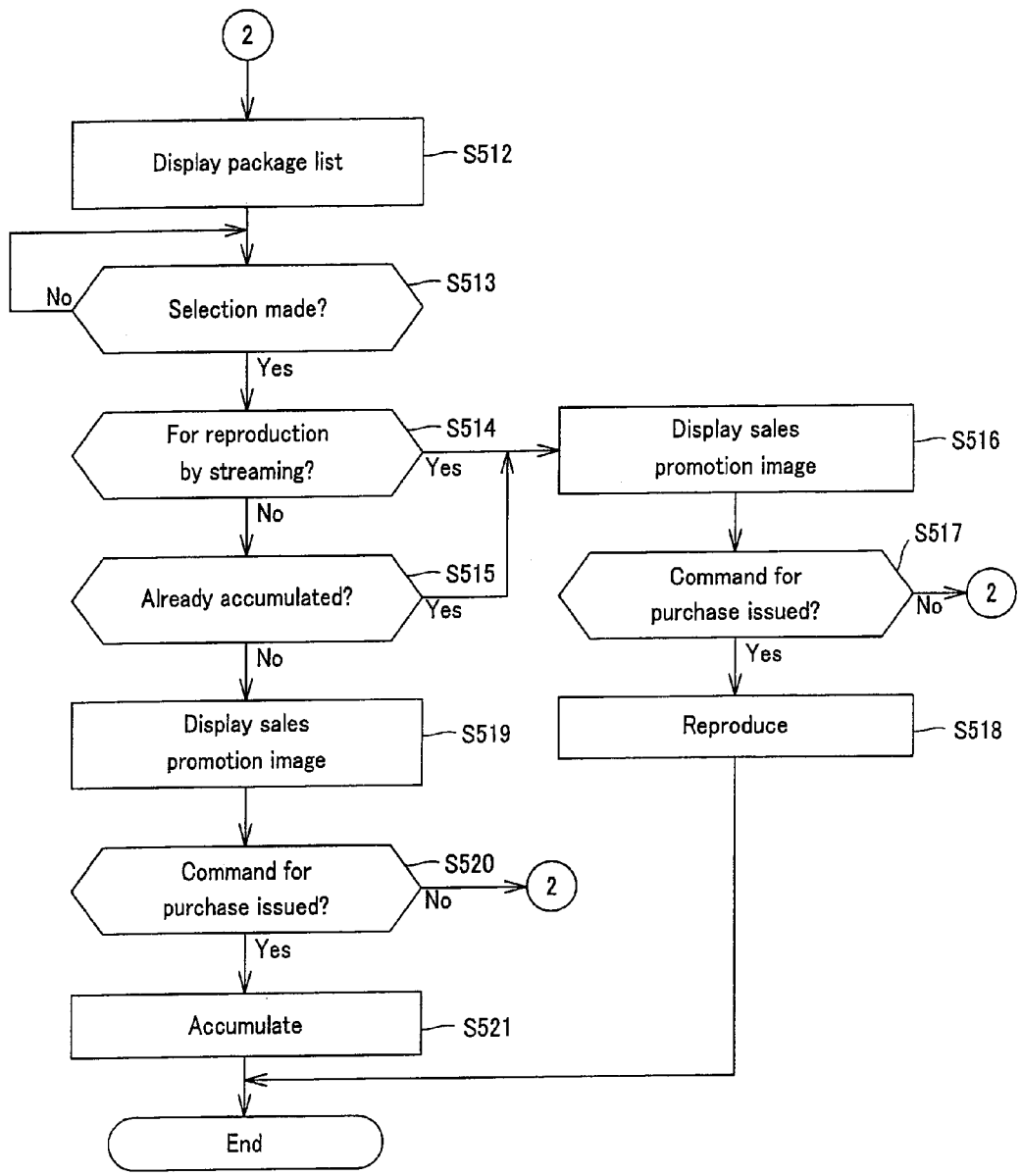
FIG. 16 is the remaining part of the flow chart of the processing operation for utilizing content by a digital television receiving set that is a component of a content delivery system.

While processes to be executed between the server 2 and the digital television receiving set 3 are described above, FIGS. 15 and 16 illustrate flow charts of processes that are to be executed at the digital television receiving set 3 that is the apparatus for utilizing content.

Figure 17:
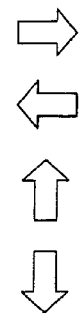
FIG. 17 is an example of list of titles that can be displayed.

As the user operates the menu button 59, the content reproducing section 24 outputs a list of titles as shown in FIG. 17 to the presenting section 22 according to the metadata stored in the metadata database 29 in Step S501.

In the instance of FIG. 17, icons for selecting a genre such as "Japanese movies", "foreign movies", "animations", "dramas" and "sports" are displayed and a list of titles of sets of content of the selected genre (which is "animations" in the instance of FIG. 17) is also displayed. The title of each set of content is displayed with information on availability, information on composition and information on accumulation.

In the illustrated instance, the first program is available "for three days" and the second program is available "for a day". The third and fourth programs are "not purchased yet" and the fifth program is "New!" The first program is composed as a "pack". The first through third programs are "already accumulated" in the content storage section 27. In other words, the fourth and fifth programs are not accumulated yet.

In Step S502, the content reproducing section 24 determines if a program is selected or not and, if it is determined that no program is selected yet, it stands by for selection of a program.

If, on the other hand, it is determined that a program is selected in Step S502, the content reproducing section 24 determines if the selected program is a "pack" program or not in Step S503. If the program is a pack program, the content reproducing section 24 proceeds to Step S504. In Step S504, the content reproducing section 24 displays a list of the titles of the sets of content that are contained in the selected program ("pack") in a manner as shown in FIG. 18.

FIG. 18 shows an image that may be displayed when the first program that is titled as "Mechanized Worrier Z Gun Gun—All Episodes in 3 Weeks" is selected. In this instance, the 47th through the last episodes (the 50th episodes) are displayed out of a series of fifty episodes. The titles can be scrolled up and/or down by operating the upward direction button 55U and/or the downward direction button 55D of the remote commander 51.

The content reproducing section 24 determines if the reproduction button 58 is operated or not in Step S505. If it is determined that the reproduction button 58 is not operated, the content reproducing section 24 proceeds to Step S506, where it determines if a command for returning to the original image is issued or not. In the instance of displayed image of FIG. 18, a "return" button is displayed and the user can input a command for returning to the original image by operating the direction buttons 55U through 55R to move the cursor 141 onto the "return" button and then operating the enter key 54. If a command for returning to the original image is not issued, the content reproducing section 24 returns to Step S505 and the processes of the subsequent steps are repeatedly executed. If, on the other hand, it is determined that a command for returning to the original image is issued, the content reproducing section 24 returns to Step S501, where the list of titles as shown in FIG. 17 is displayed again, and then the processes of the subsequent steps are executed.

If it is determined that the reproduction button 58 is operated in Step S505, the content reproducing section 24 proceeds to Step S507. The content reproducing section 24 skips the processes of Steps S504 through S506 and proceeds to Step S507 when it is determined in Step S502 that a program is selected and in Step S503 that the selected program is not a pack program (in other words, the selected program is a program of a single set of content).

In Step S507, the content reproducing section 24 determines if the program (set or sets of content) reproduced or selected in Step S507 is already purchased or not. If the program is already purchased, the content reproducing section 24 proceeds to Step S508, where it determines if the content is those to be reproduced by streaming or not. This determination is made on the basis if the startup file of the program (content) describes "stream" or not. If it is determined that the program (content) is content to be reproduced by streaming (if the startup file describes "stream"), the content reproducing section 24 proceeds to Step S511, where it reproduces the content. More specifically, as described above, the encrypted content that are delivered by streaming from the content server 75 are decrypted by means of the key Kc and supplied to the processing section 22, where they are displayed. Note that, it is possible to determine the type of delivery of the content not on the basis of the startup file but on the basis of the description of the license metadata of the program.

If it is determined that the content is not those to be reproduced by streaming (if the startup file describes "download") in Step S508, the content reproducing section 24 proceeds to Step S509, where it determines if the content is already accumulated or not. If the content is already accumulated, the content reproducing section 24 proceeds to Step S511, where it reads out the encrypted content data from the content storage section 27 and decrypts them by means of the key Kc. Then, it supplies the decrypted content to the presenting section 22 and has it display the content.

If it is determined in Step S509 that the content is not accumulated yet, the content reproducing section 24 proceeds to Step S510, in which the content storage section 27 executes the process of accumulating the content. More specifically, the files to be downloaded by the content server 75 are received by the content storage section 27 and stored in the latter.

If, on the other hand, it is determined in Step S507 that the content is not purchased yet, the content reproducing section 24 proceeds to Step S512, where it executes the process of displaying a package list (which packet list is contained in the package metadata).

Figure 19:
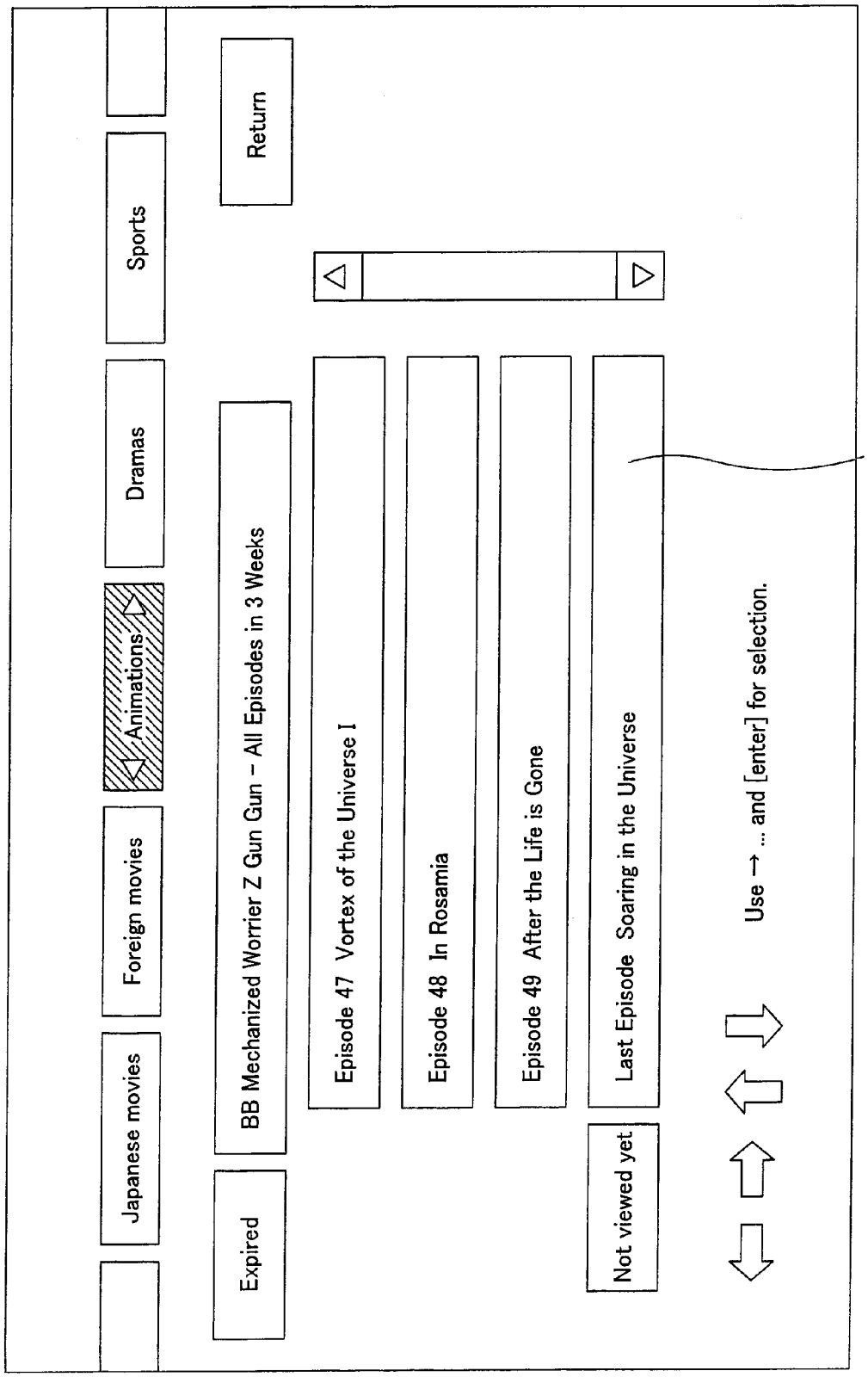
FIG. 19 is another example of list of titles in the package shown in FIG. 17.

For example, assume that a list of titles as shown in FIG. 19 is displayed in the process of displaying the list of titles in the pack in Step S509. According to the list of titles shown in FIG. 19, the availability information tells that the available period of the sets of content in question has "expired". Therefore, if the user selects the lowermost one of the four episodes displayed to the user, or "the Last Episode: Soaring in the Universe" that is "not viewed yet", in FIG. 19, the user has to purchase it for viewing. Then, in Step S507, it is determined that the episode is not purchased by the user. In the case of the illustrated instance, the episode may be provided by way of one of three possible modes of purchase. Therefore, in Step S512, the three modes of purchase are displayed to the user in a manner as shown in FIG. 20.

Figure 20:
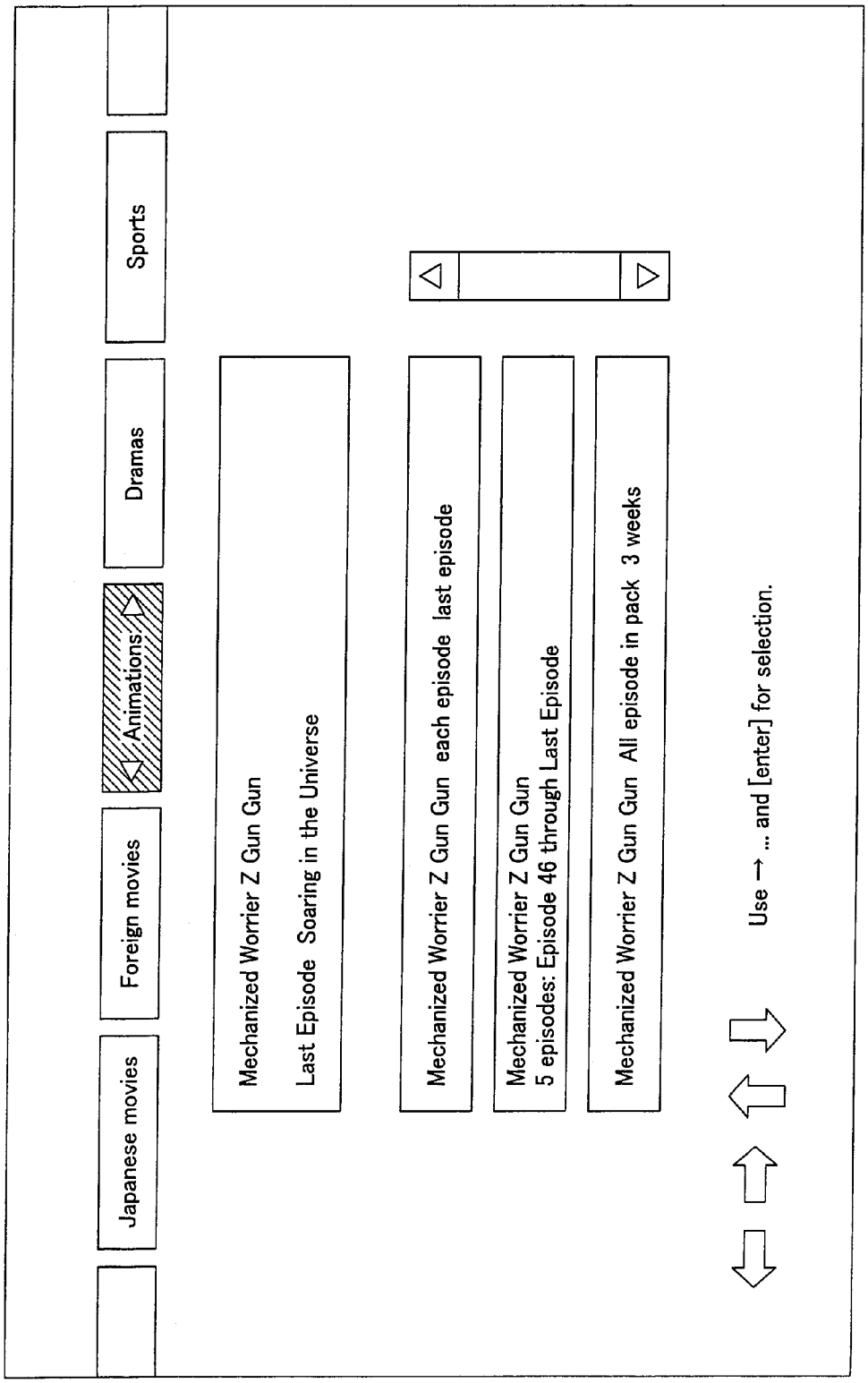
FIG. 20 is an example of package list that can be displayed.

In the uppermost mode of purchase in FIG. 20, the user can purchase only "the Last Episode". In the second mode of purchase in FIG. 20, the user can purchase a pack of "five episodes" from "the Episode 46" down to "the Last Episode". In the third mode of purchase in FIG. 20, the user can purchase a pack of all the episodes from "the Episode 1" down to "the Last Episode".

The user is expected to select one of the three modes of purchase by operating the remote commander 51.

Figure 21:
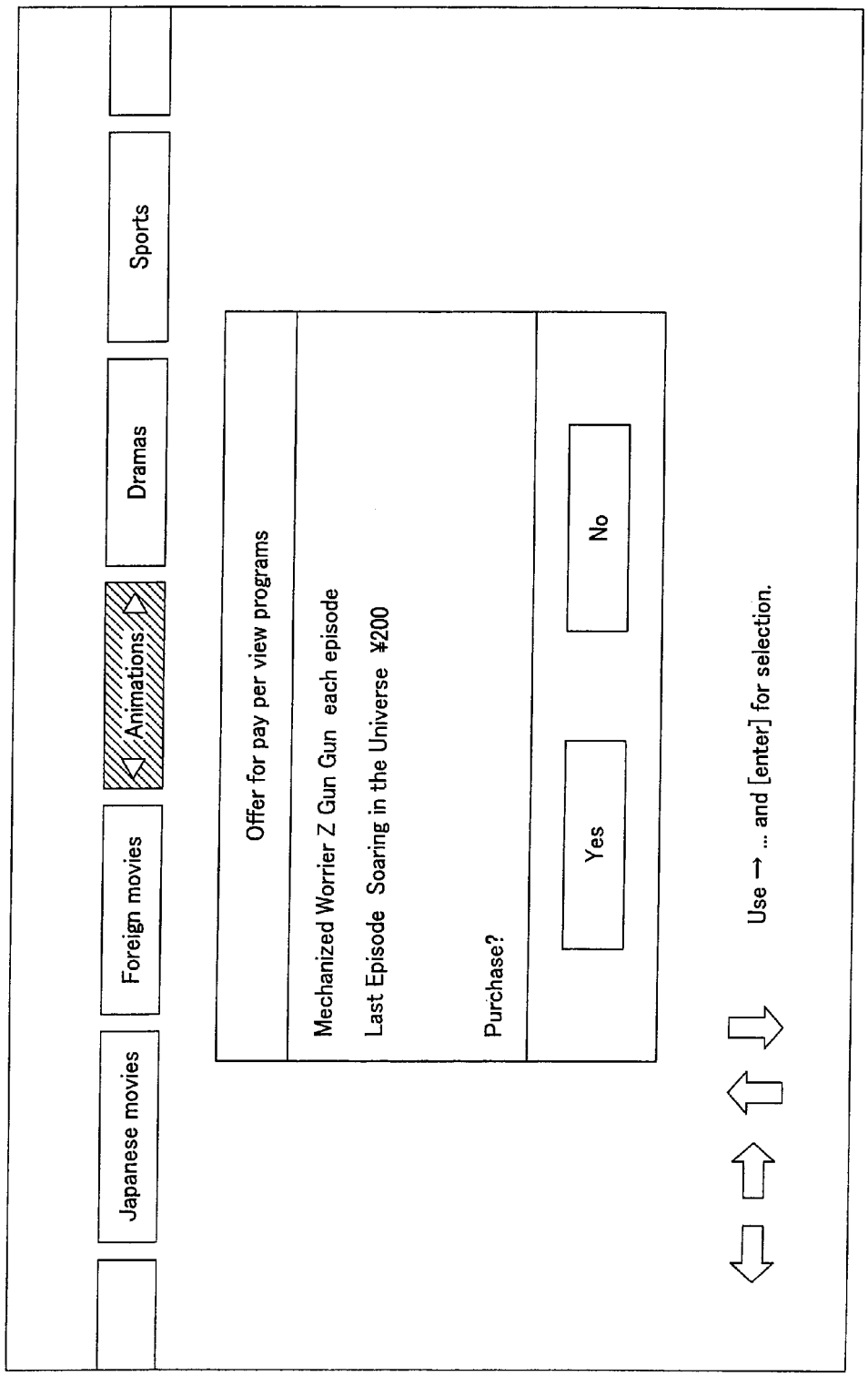
FIG. 21 is an example of image of sales promotion that can be displayed.

Thus, in Step S513, the content reproducing section 24 stands by until one of the three modes of purchase is selected by the user. If it is determined that one of the three modes of purchase is selected by the user, the content reproducing section 24 proceeds to Step S514, where it determines if the selected episode (set of content) is a set of content to be reproduced by streaming or not. If the selected episode is a set of content to be reproduced by streaming, the content reproducing section 24 proceeds to Step S516, where it displays a sales promotion image as shown in FIG. 21, which is only an example. In the example of FIG. 21, it is displayed that a single episode of "the Last Episode: Soaring in the Universe" can be purchased for "\200". The user can select either the button of "yes" or that of "no" in response to the sales promotion. More specifically, the user can select either the button of "yes" or that of "no" by operating the direction buttons 55U through 55R and the enter button 54 of the remote commander 51 to indicate that he or she purchases or does not purchase the episode.

If the user does not purchase the episode (if the button of "no" is operated), the content reproducing section 24 returns to Step S512 to display the package list (FIG. 20) again and the subsequent processes are executed.

If it is determined in Step S517 that user issued a command for purchasing the episode (the button of "yes" is operated), the content reproducing section 24 proceeds to Step S518, where it executes the process of reproducing the set of content. Since the content is reproduced by streaming in this instance, the set of content that is delivered by streaming from the content server 75 is received, decrypted and presented to the presenting section 22.

If it is determined in Step S514 that the selected episode (set of content) is not content to be reproduced by streaming (and hence it is content to be reproduced by downloaded files), the content reproducing section 24 proceeds to Step S515, where it determines if the set of content is already accumulated or not. If the set of content is already accumulated, the content reproducing section 24 proceeds to Step S516, in which it displays a sales promotion image as shown in FIG. 21 in a manner as described above. Then, as described above, the user can select either the button of "yes" or that of "no" by operating the direction buttons 55U through 55R and the enter button 54 of the remote commander 51 to indicate that he or she purchases or does not purchase the episode. If the user does not purchase the episode, the content reproducing section 24 returns to Step S512.

If, on the other hand, it is determined that user issued a command for purchasing the episode, the content reproducing section 24 proceeds to Step S518, where it executes the process of reproducing the set of content. Since the set of content is already stored in the content storage section 27, the content reproducing section 24 reproduces the set of content stored in the content storage section 27, decrypts it and then supplies it to the presenting section 22 so as to have it display the set of content.

Figure 22:
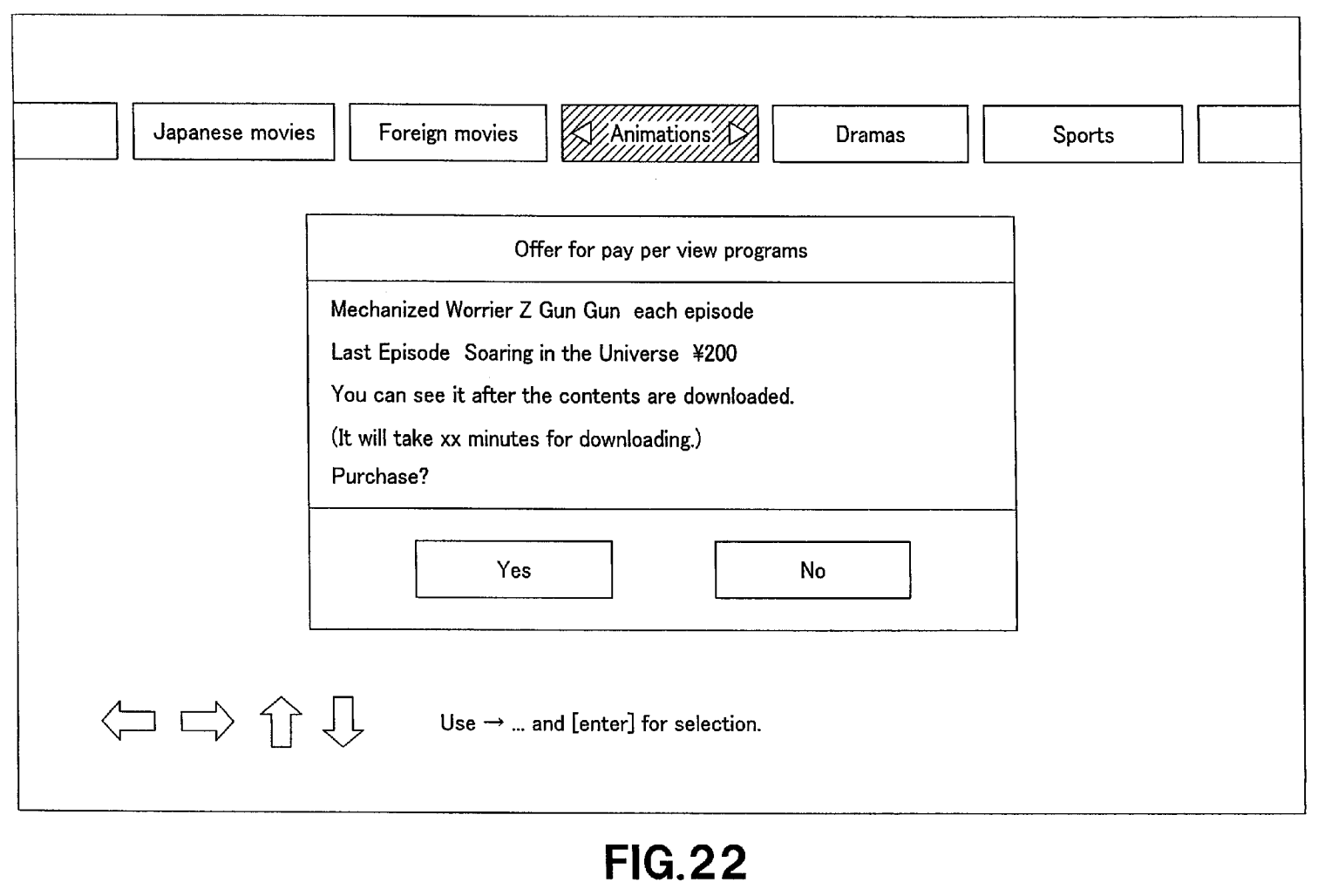

If it is determined in Step S515 that the set of content is not accumulated yet, the content reproducing section 24 proceeds to Step S519, where it has the presenting section 22 display a sales promotion image as shown in FIG. 22.

FIG. 22 shows an image that may be displayed when the user selected the first mode of purchase in the image of FIG. 20. While the image of FIG. 21 is displayed in Step S516 when the user also selects the first mode of purchase shown in FIG. 20 but the set of content is delivered by streaming. On the other hand, the image of FIG. 22 is displayed when the user selects the first mode of purchase but the set of content is delivered by downloaded files. In this case, a message "It will take xx minutes for downloading" is displayed in addition to the title of the program. Again, the user selects the button of "yes" if he or she wants to purchase the content, whereas the user selects the button of "no" if he or she does not want to purchase the content.

In Step S520, the content reproducing section 24 determines if a command for purchasing the content is issued or not and, if no command is issued (since the button of "no" is selected), it returns to Step S512, where it displays a package list as shown in FIG. 20 once again and executes the subsequent processes.

If, on the other hand, it is determined in Step S520 that a command for purchasing the content is issued (since the button of "yes" is selected), the content reproducing section 24 proceeds to Step S521, where it downloads the files of the content and executes the accumulation process. More specifically, the files to be downloaded that are supplied from the content server 75 are actually downloaded to and stored in the content storage section 27.

Thus, the list of sets of content that is presented to the user includes those to be delivered by streaming and those to be delivered by downloaded files as a mixture thereof. However, the type of delivery is not displayed to the user. In other words, only the titles of the programs (packages) are displayed to the user. Therefore, the user is not required to pay attention to if the set of content he or she purchases is delivered by streaming or by downloaded files and can receive the program simply by selecting it. Furthermore, the user is not required to consider if the program is already purchased or not. When the program is not purchased yet, a message asking the user to purchase it or not is displayed. Then, the user simply has to answer the question.

If the set of content is already purchased and is to be delivered by streaming or already accumulated, it is automatically reproduced. Therefore, any person who may be a senior person, a child and may not have knowledge on the Internet and protocols can view the set of content without fail in a simple manner. The various pieces of information to be presented to the user are contained in the package metadata. Although not illustrated, the server 2 and the digital television receiving set 3 have respective communication sections that operate for interface processes necessary when communicating with each other by way of the Internet 1. Data are encrypted before they are exchanged.

While the present invention is applied to digital television receiving sets in the above description, the present invention can also be applied to video cassette recorders, television tuners, hard disc recorders, DVD (digital versatile disc) recorders and various other content processing apparatus.

The content to be delivered are not limited to those of television programs and various other content may also be delivered according to the invention.

The above-described processes may be executed by means of hardware. Alternatively, they may be executed by means of software. If they are executed by means of software, the digital television receiving set 3 includes a computer as shown in FIG. 23.

Figure 23:
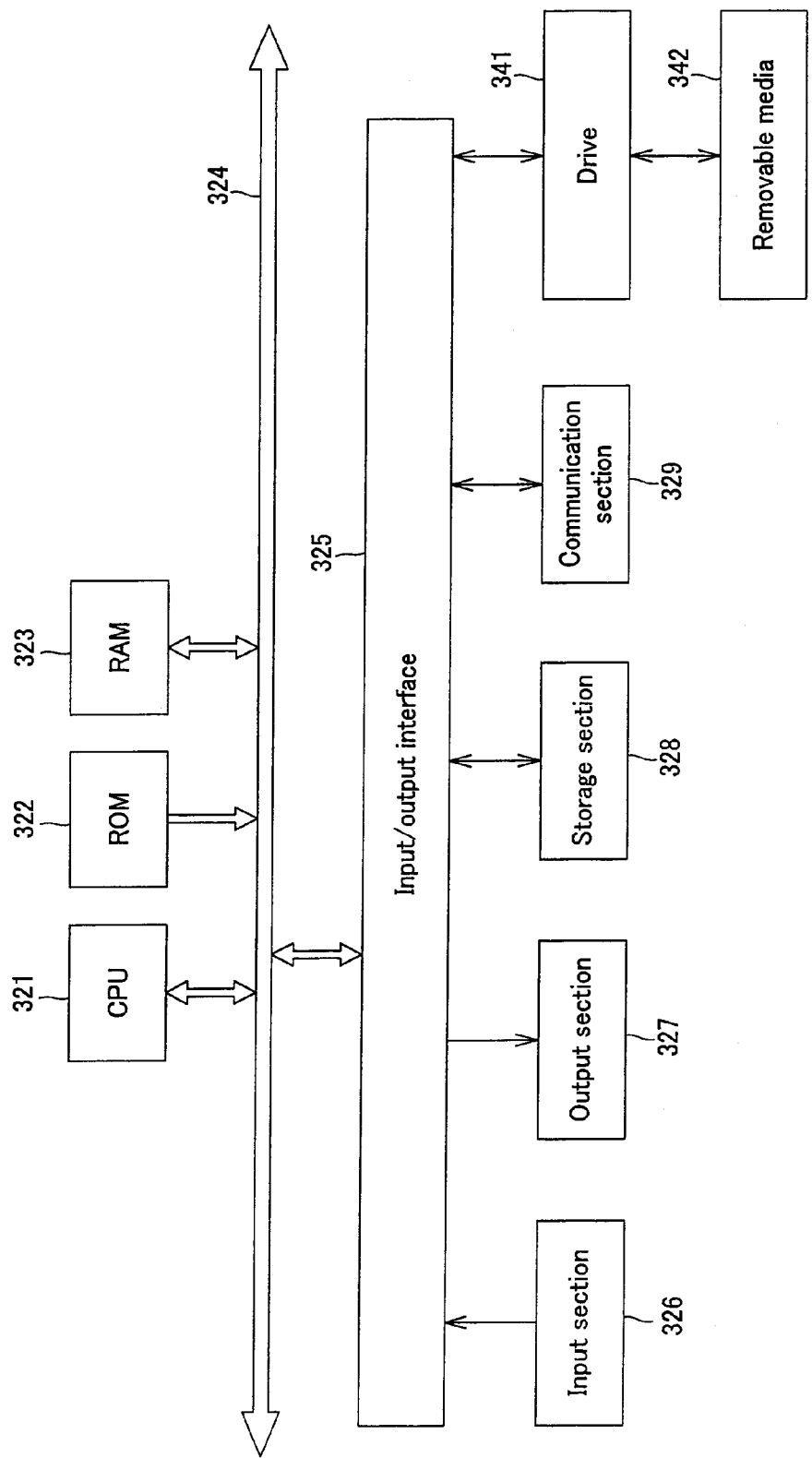
FIG. 23 is a schematic block diagram of a personal computer, showing the structure thereof.

Referring to FIG. 23, CPU (central processing unit) 321 executes various processes according to the programs stored in ROM (read only memory) 322 or the programs loaded from storage section 328 to RAM (random access memory) 323. The RAM 323 appropriately stores the data necessary for the CPU 321 to execute various processes.

The CPU 321, the ROM 322 and the RAM 323 are connected to each other by way of bus 324. The bus 324 also connected to input/output interface 325.

The input/output interface 325 is by turn connected to an input section 326, a display that is typically formed by using a CRT (cathode ray tube) or an LCD (liquid crystal display), an output section 327 that typically comprises a speaker, a storage section 328 that typically comprises a hard disc and a communication section 329 that typically comprises a modem. The communication section 329 communicates with other components of the system by way of a network, which may typically be the Internet 1.

If necessary, the input/output interface 325 is connected to a drive 341 and equipped with a removable media 342, which may be a magnetic disc, an optical disc, a magneto-optical disc or a semiconductor memory and, if necessary, the computer program read out from it is installed in the storage section 328.

When the above-described processes are executed by means of software, the programs composing the software are installed from a network or a recording medium.

As shown in FIG. 23, the recording medium is a removable media 342, which may be a magnetic disc (such as a floppy disc), an optical disc (such as a CD-ROM (compact disc—read only memory), a DVD (digital versatile disc) or the like), a magneto-optical disc (such as an MD (mini-disc)) or a semiconductor memory, may be arranged apart from the apparatus main body to store programs to be distributed to the user. Alternatively, it may be the ROM 322 or the hard disc included in the storage section 328 that is incorporated into the apparatus main body before it is delivered to the user with the programs stored in it.

For the purpose of the present invention, the steps describing the programs recorded in the recording medium include processes to be executed in time series in the described sequence and also those to be executed not necessarily in time series but in parallel or individually.

For the purpose of the present invention, a system refers to an arrangement comprising a plurality of apparatus.

The present invention is by no means limited to the above embodiments that are described by referring to the accompanying drawings, which may be altered, replaced or subjected to equivalent operations without departing from the spirit and scope of the present invention as defined by the appended claims.

INDUSTRIAL APPLICABILITY

As described above, according to the invention, it is possible to deliver the content in a particularly easy and reliable manner. More specifically, it is possible to deliver such content to general users who do not have specific technical knowledge relative to the mode of delivery without sacrificing the operability of the apparatus. Therefore, it is possible to make systems for delivering such content by way of the Internet and other networks much more popular.

The invention claimed is:

1. A content processing apparatus configured to receive content from a content delivery apparatus via a network, the content processing apparatus comprising:
a memory configured to store first data including a title of the content;
a display configured to display a list of content based on the first data;
a network interface configured to transmit request information including first request information corresponding to a license of the content, second request information corresponding to an acquisition destination of the content, a license ID, and a user ID, wherein the license of the content includes the license ID, a usage rule and a bundle of content keys for decrypting the content;
the network interface configured to receive a result indicating whether reproduction of the content is permitted based on the first request information, the license ID and the user ID, and to receive the destination information corresponding to the content based on the second request information; and
a reproduction section configured to reproduce the content when said result indicates that reproduction of the content is permitted.

2. The content processing apparatus according to claim 1, wherein the first data stored in the memory is metadata including titles corresponding to a plurality of content data.

3. The content processing apparatus according to claim 1, wherein the destination information corresponding to the content is a Uniform Resource Locator (URL) corresponding to the content delivery apparatus from which the content is retrieved by the content processing apparatus.

4. A content processing method performed by a content processing apparatus for receiving content from a content delivery apparatus via a network, the method comprising:
storing, at a memory of the content processing apparatus, first data including a title of the content;
displaying, at a display of the content processing apparatus, a list of content based on the first data;
transmitting, from a network interface of the content processing apparatus, request information including first request information corresponding to a license of the content, second request information corresponding to an acquisition destination of the content, a license ID, and a user ID, wherein the license of the content includes the license ID, a usage rule and a bundle of content keys for decrypting the content;
receiving, by the network interface of the content processing apparatus, a result indicating whether reproduction of the content is permitted based on the first request information, the license ID and the user ID, and receiving the destination information corresponding to the content based on the second request information; and
reproducing, at the content processing apparatus, the content when said result indicates that reproduction of the content is permitted.

5. The content processing method according to claim 4, wherein the first data stored at the memory is metadata including titles corresponding to a plurality of content data.

6. The content processing method according to claim 4, wherein the destination information corresponding to the content is a Uniform Resource Locator (URL) corresponding to the content delivery apparatus from which the content is retrieved by the content processing apparatus.

7. A non-transitory computer-readable medium including computer program instructions, which when executed by a content processing apparatus, cause the content processing apparatus to perform a method for receiving content from a content delivery apparatus via a network, the method comprising:
storing first data including a title of the content;
displaying a list of content based on the first data;
transmitting request information including first request information corresponding to a license of the content, second request information corresponding to an acquisition destination of the content, a license ID, and a user ID, wherein the license of the content includes the license ID, a usage rule and a bundle of content keys for decrypting the content;
receiving a result indicating whether reproduction of the content is permitted based on the first request information, the license ID and the user ID, and receiving the destination information corresponding to the content based on the second request information; and reproducing the content when said result indicates that reproduction of the content is permitted.

8. The non-transitory computer-readable medium according to claim 7, wherein the first data is metadata including titles corresponding to a plurality of content data.

9. The non-transitory computer-readable medium according to claim 7, wherein the destination information corresponding to the content is a Uniform Resource Locator (URL) corresponding to the content delivery apparatus from which the content is retrieved by the content processing apparatus.

10. A content delivery apparatus configured to provide content to a content processing apparatus via a network, the content delivery apparatus comprising:
  a network interface device configured to receive, from the content processing apparatus, request information including first request information corresponding to a license of the content, second request information corresponding to an acquisition destination of the content, a license ID, and a user ID, wherein the license of the content includes the license ID, a usage rule and a bundle of content keys for decrypting the content; and
  the network interface device configured to transmit, to the content processing apparatus, a result indicating whether reproduction of the content is permitted based on the first request information, the license ID and the user ID, and to transmit the destination information corresponding to the content based on the second request information.

11. The content delivery apparatus according to claim 10, further comprising:
  a judgment module configured to judge whether reproduction of the content is permitted based on the first request information, the license ID and the user ID.

12. The content delivery apparatus according to claim 10, wherein the destination information corresponding to the content is a Uniform Resource Locator (URL) corresponding to a storage location of the content.

13. A content delivery method performed by a content delivery apparatus for providing content to a content processing apparatus via a network, the content delivery method comprising:
  receiving, at a network interface of the content delivery apparatus from the content processing apparatus, request information including first request information corresponding to a license of the content, second request information corresponding to an acquisition destination of the content, a license ID, and a user ID, wherein the license of the content includes the license ID, a usage rule and a bundle of content keys for decrypting the content; and
  transmitting, from the network interface of the content delivery apparatus to the content processing apparatus, a result indicating whether reproduction of the content is permitted based on the first request information, the license ID and the user ID, and transmitting the destination information corresponding to the content based on the second request information.

14. The content delivery method according to claim 13, further comprising:
  judging whether reproduction of the content is permitted based on the first request information, the license ID and the user ID.

15. The content delivery method according to claim 13, wherein the destination information corresponding to the content is a Uniform Resource Locator (URL) corresponding to a storage location of the content.

16. A non-transitory computer-readable medium including computer program instructions, which when executed by a content delivery apparatus cause the content delivery apparatus to perform a method for providing content to a content processing apparatus via a network, the content delivery method comprising:
  receiving, from the content processing apparatus, request information including first request information corresponding to a license of the content, second request information corresponding to an acquisition destination of the content, a license ID, and a user ID wherein the license of the content includes the license ID, a usage rule and a bundle of content keys for decrypting the content; and
  transmitting, to the content processing apparatus, a result indicating whether reproduction of the content is permitted based on the first request information, the license ID and the user ID, and transmitting the destination information corresponding to the content based on the second request information.

17. The non-transitory computer-readable medium according to claim 16, further comprising:
  judging whether reproduction of the content is permitted based on the first request information, the license ID and the user ID.

18. The non-transitory computer-readable medium according to claim 16, wherein the destination information corresponding to the content is a Uniform Resource Locator (URL) corresponding to a storage location of the content.

* * * * *